(12) United States Patent
Mairs et al.

(10) Patent No.: US 8,024,054 B2
(45) Date of Patent: Sep. 20, 2011

(54) BUILDING AUTOMATION SYSTEM FACILITATING USER CUSTOMIZATION

(75) Inventors: Susan M. Mairs, St. Paul, MN (US); Sean M. McCoy, Maple Grove, MN (US); David M. Richards, Andover, MN (US); Benedict Eiynk, Minneapolis, MN (US); Jeffrey S. Seewald, St. Paul, MN (US); James Brink, Andover, MN (US); Deborah A. McConnell, Edina, MN (US); Delight Demulling, Lino Lakes, MN (US); Judy K Kistler-Robinson, Plano, TX (US)

(73) Assignee: Trane International, Inc., New York, NY (US)

( * ) Notice: Subject to any disclaimer, the term of this patent is extended or adjusted under 35 U.S.C. 154(b) by 845 days.

(21) Appl. No.: 11/316,702

(22) Filed: Dec. 22, 2005

(65) Prior Publication Data
US 2007/0067062 A1 Mar. 22, 2007

Related U.S. Application Data

(63) Continuation-in-part of application No. 11/208,773, filed on Aug. 22, 2005.

(51) Int. Cl.
*G05B 15/00* (2006.01)
(52) U.S. Cl. ............ 700/83; 700/17; 700/275; 700/276; 715/700; 715/762
(58) Field of Classification Search ............ 379/102.01, 379/102.02, 102.05; 700/17, 275, 276, 277, 700/278, 291, 83; 705/412; 709/217, 218, 709/219; 715/207, 700, 712, 736, 744, 747, 715/762, 763, 771, 804, 825, 826
See application file for complete search history.

(56) References Cited

U.S. PATENT DOCUMENTS

| | | | |
|---|---|---|---|
| 5,311,451 A | 5/1994 | Barrett |
| 5,321,603 A | 6/1994 | Schwenke |
| 5,384,697 A | 1/1995 | Pascucci |
| 5,444,851 A | 8/1995 | Woest |
| 5,463,735 A | 10/1995 | Pascucci et al. |
| 5,511,188 A | 4/1996 | Pascucci et al. |
| 5,522,044 A | 5/1996 | Pascucci et al. |
| 5,550,980 A | 8/1996 | Pascucci et al. |
| 5,559,955 A | 9/1996 | Dev et al. |
| 5,598,566 A | 1/1997 | Pascucci et al. |
| 5,761,432 A | 6/1998 | Bergholm |
| 5,805,442 A | 9/1998 | Crater et al. |
| 5,884,072 A | 3/1999 | Rasmussen |
| 5,982,362 A | 11/1999 | Crater et al. |
| 5,999,179 A | 12/1999 | Kekic |
| 6,028,998 A | 2/2000 | Gloudeman et al. |

(Continued)

OTHER PUBLICATIONS

"Tracer Summit, Building Automation System", TRANE, Doc # BAS-PRC001-EN, Aug. 2002.*

(Continued)

*Primary Examiner* — Kakali Chaki
*Assistant Examiner* — Carlos Ortiz Rodriguez
(74) *Attorney, Agent, or Firm* — Patterson Thuente IP

(57) ABSTRACT

Systems and methods for interacting with and customizing a dynamically extensible and automatically configurable building automation system (BAS). In one embodiment, a graphical user interface (GUI) of the BAS comprises a building summary pages. The invention is also directed to a space summary page and an equipment summary page.

41 Claims, 35 Drawing Sheets

U.S. PATENT DOCUMENTS

| | | | |
|---|---|---|---|
| 6,067,477 A | 5/2000 | Wewalaarachchi et al. |
| 6,098,116 A | 8/2000 | Nixon et al. |
| 6,104,963 A | 8/2000 | Cebasek et al. |
| 6,115,713 A | 9/2000 | Pascucci et al. |
| 6,119,125 A | 9/2000 | Gloudeman et al. |
| 6,141,595 A | 10/2000 | Gloudeman et al. |
| 6,145,751 A | 11/2000 | Ahmed |
| 6,148,355 A | 11/2000 | Mahalingam |
| 6,154,681 A | 11/2000 | Drees et al. |
| 6,157,943 A | 12/2000 | Meyer |
| 6,167,316 A | 12/2000 | Gloudeman et al. |
| 6,240,326 B1 | 5/2001 | Gloudeman et al. |
| 6,241,156 B1 | 6/2001 | Kline et al. |
| 6,263,387 B1 | 7/2001 | Chrabaszcz |
| 6,266,726 B1 | 7/2001 | Nixon et al. |
| 6,334,107 B1 | 12/2001 | Gale et al. |
| 6,353,853 B1 | 3/2002 | Gravlin |
| 6,389,331 B1 | 5/2002 | Jensen et al. |
| 6,405,103 B1 | 6/2002 | Ryan et al. |
| 6,487,457 B1 | 11/2002 | Hull et al. |
| 6,496,893 B1 | 12/2002 | Arai |
| 6,580,950 B1 | 6/2003 | Johnson et al. |
| 6,584,095 B1 | 6/2003 | Jacobi et al. |
| 6,584,096 B1 | 6/2003 | Allan |
| 6,598,056 B1 | 7/2003 | Hull et al. |
| 6,636,893 B1 | 10/2003 | Fong |
| 6,708,505 B2 | 3/2004 | Nakamura et al. |
| 6,714,977 B1 | 3/2004 | Fowler et al. |
| 6,832,120 B1 | 12/2004 | Frank et al. |
| 6,834,298 B1 | 12/2004 | Singer |
| 6,925,571 B1 | 8/2005 | Motoyama |
| 6,999,824 B2 | 2/2006 | Glanzer et al. |
| 7,010,796 B1 | 3/2006 | Strom et al. |
| 7,065,769 B1 | 6/2006 | Tolopka |
| 7,080,142 B2 | 7/2006 | Galloway et al. |
| 7,136,914 B2 | 11/2006 | Motoyama |
| 7,165,109 B2 | 1/2007 | Chiloyan et al. |
| 7,194,537 B2 | 3/2007 | Motoyama |
| 7,206,791 B2 | 4/2007 | Hind et al. |
| 7,240,106 B2 | 7/2007 | Cochran et al. |
| 7,246,162 B2 | 7/2007 | Tindal |
| 7,249,170 B2 | 7/2007 | Tindal et al. |
| 7,250,856 B2 * | 7/2007 | Havekost et al. ............ 340/517 |
| 7,251,534 B2 | 7/2007 | Walls et al. |
| 7,275,079 B2 | 9/2007 | Brodsky et al. |
| 7,287,085 B1 | 10/2007 | Motoyama |
| 7,287,257 B2 | 10/2007 | Meza |
| 7,289,995 B2 | 10/2007 | Motoyama et al. |
| 7,293,253 B1 | 11/2007 | Soukup |
| 7,296,079 B2 | 11/2007 | Motoyama |
| 7,302,469 B2 | 11/2007 | Motoyama |
| 7,320,023 B2 | 1/2008 | Chintalapati et al. |
| 7,337,242 B1 | 2/2008 | Motoyama |
| 7,349,761 B1 | 3/2008 | Cruse |
| 7,392,310 B2 | 6/2008 | Motoyama |
| 7,421,474 B2 | 9/2008 | Motoyama |
| 7,433,740 B2 | 10/2008 | Hesse et al. |
| 7,437,452 B2 | 10/2008 | Motoyama |
| 7,437,596 B2 | 10/2008 | McFarland |
| 7,447,766 B2 | 11/2008 | Motoyama |
| 7,500,003 B2 | 3/2009 | Motoyama |
| 7,502,848 B2 | 3/2009 | Motoyama |
| 7,506,048 B1 | 3/2009 | Motoyama |
| 7,512,450 B2 | 3/2009 | Ahmed |
| 7,516,698 B2 | 4/2009 | Motoyama |
| 7,533,167 B2 | 5/2009 | Motoyama |
| 7,533,333 B2 | 5/2009 | Motoyama |
| 7,536,505 B2 | 5/2009 | Motoyama |
| 7,574,503 B2 | 8/2009 | Motoyama |
| 7,606,894 B2 | 10/2009 | Motoyama |
| 7,610,372 B2 | 10/2009 | Motoyama |
| 7,610,374 B2 | 10/2009 | Motoyama |
| 7,634,555 B1 | 12/2009 | Wainscott, Jr. et al. |
| 7,647,397 B2 | 1/2010 | Motoyama |
| 7,765,826 B2 | 8/2010 | Nichols |
| 2002/0016639 A1 | 2/2002 | Smith et al. |
| 2002/0042845 A1 | 4/2002 | Burmann et al. |
| 2002/0136203 A1 | 9/2002 | Liva et al. |
| 2002/0152028 A1 | 10/2002 | Motoyama |
| 2002/0152292 A1 | 10/2002 | Motoyama |
| 2003/0084176 A1 | 5/2003 | Tewari et al. |
| 2003/0135765 A1 | 7/2003 | Hind et al. |
| 2003/0158975 A1 | 8/2003 | Frank et al. |
| 2003/0159129 A1 | 8/2003 | Frank et al. |
| 2003/0167323 A1 | 9/2003 | Motoyama |
| 2004/0059808 A1 | 3/2004 | Galloway et al. |
| 2004/0075549 A1 | 4/2004 | Haller |
| 2004/0143510 A1 | 7/2004 | Haeberle et al. |
| 2004/0148288 A1 | 7/2004 | Haeberle et al. |
| 2004/0215694 A1 | 10/2004 | Podolsky |
| 2004/0215740 A1 | 10/2004 | Frank et al. |
| 2004/0230323 A1 | 11/2004 | Glanzer et al. |
| 2004/0243988 A1 | 12/2004 | Ota |
| 2004/0249913 A1 | 12/2004 | Kaufman |
| 2004/0254915 A1 | 12/2004 | Motoyama |
| 2004/0255023 A1 | 12/2004 | Motoyama |
| 2005/0071483 A1 | 3/2005 | Motoyama |
| 2005/0090915 A1 | 4/2005 | Geiwitz |
| 2005/0177642 A1 | 8/2005 | Motoyama |
| 2006/0010232 A1 | 1/2006 | Page et al. |
| 2006/0047787 A1 | 3/2006 | Agarwal et al. |
| 2006/0058923 A1 | 3/2006 | Kruk et al. |
| 2006/0130107 A1 | 6/2006 | Gonder et al. |
| 2006/0155824 A1 | 7/2006 | Motoyama et al. |
| 2006/0184659 A1 | 8/2006 | Motoyama et al. |
| 2007/0005736 A1 | 1/2007 | Hansen et al. |
| 2007/0043476 A1 | 2/2007 | Richards et al. |
| 2007/0055698 A1 | 3/2007 | McCoy et al. |
| 2007/0055756 A1 | 3/2007 | Richards et al. |
| 2007/0055757 A1 | 3/2007 | Mairs et al. |
| 2007/0055758 A1 | 3/2007 | McCoy et al. |
| 2007/0055759 A1 | 3/2007 | McCoy et al. |
| 2007/0055760 A1 | 3/2007 | McCoy et al. |
| 2007/0061046 A1 | 3/2007 | Mairs et al. |
| 2007/0261062 A1 | 11/2007 | Bansal et al. |
| 2009/0083416 A1 | 3/2009 | Nass et al. |

OTHER PUBLICATIONS

"BACnet, LonWorks War Continues for Bas Manufacturers", p. 14, Mar. 10, 1997 Issue of Air Conditioning, Heating & Refrigeration News.

"Controls Companies See Opportunities on Internet", Mar. 1, 1997 Issue of Energy User News.

Tracer Summit Web Server, Dated Mar. 2003, Document No. BAS-PRC014-EN.

"Infinity WebServer" brochure, Copyright 1997 by Andover Controls Corporation, Document No. DS-WEBSVR-A.

"Facility Management Unleashed: web.Client", Copyright 2002 by Andover Controls, Document No. BR-WC-A.

"Building Automation Systems on the Internet", by Albert T.P. SO, W. L. Chan and W.L. TSE, May/Jun. 1997 Issue of Facilities Magazine, vol. 15, No. 5/6, pp. 125-133.

"Connecting LonWorks and TCP/IP Enterprise Networks—Real Application Successes", by Coactive Aesthetics, dated 1997.

"Remote Building Monitoring and Control", An ACEEE paper, dated Jul. 18, 1996.

"Remote Building Control Using the Internet", by Edward Finch, Dec. 1998 Issue of Facilities Magazine, vol. 15-No. 12/13, pp. 356-360.

"Marketing Tracer Summit", a marketing guide dated Jan. 1998, Order No. BAS-MG-46.

"Tracer Summit Users Network", a marketing guide dated Mar. 2002, Order No. BAS-SLM005-EN.

Marketing the Tracer ZN.511 and ZN.521 Zone Controllers, a marketing guide dated Feb. 2001, Order No. BAS-SLM008-EN.

"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7; http://research.microsoft.com/~cszypers/events/WCOP2002/10_Gal.pdf.

Microsoft Computer Dictionary, Fifth Edition, "Server" definition, Published: 2002, Publisher: Microsoft Press, p. 474.

GB Examination Report dated Aug. 10, 2009, 1 page.

Application and File History of U.S. Appl. No. 11/208,773, Inventors Richards et al., filed Aug. 22, 2005.
Application and File History of U.S. Appl. No. 11/316,410, Inventors Richards et al., filed Dec. 22, 2005.
Application and File History of U.S. Appl. No. 11/316,695, Inventors McCoy et al., filed Dec. 22, 2005.
Application and File History of U.S. Appl. No. 11/316,698, Inventors McCoy et al., filed Dec. 22, 2005.
Application and File History of U.S. Appl. No. 11/316,703, Inventors McCoy et al., filed Dec. 22, 2005.
Application and File History of U.S. Appl. No. 11/316,697, Inventors McCoy et al., filed Dec. 22, 2005.
Application and File History of U.S. Appl. No. 11/316,687, Inventors Mairs et al., filed Dec. 22, 2005.
Application and File History of U.S. Appl. No. 11/316,699, Inventors Mairs et al., filed Dec. 22, 2005.
personalSCADA 2.0 User's Guide, Eutech Cybernetics Pte Ltd., 2002.
GB Patent Application No. GB0805153.4; filed Aug. 17, 2006; Applicant Trane International, Inc.; GB Examination Report dated Mar. 12, 2010; 2 pages.
GB Patent Application No. GB1002641.7; filed Aug. 17, 2006; Applicant Trane International, Inc.; GB Search Report dated Mar. 12, 2010; 3 pages.
PCT Patent Application No. PCT/US2006/032141, Applicant American Standard International, Inc., Written Opinion, dated Oct. 2, 2008.
PCT Patent Application No. PCT/US2006/031863, Applicant American Standard International, Inc., Search Report, dated Mar. 19, 2008.
British Application No. GB0805149.2, Examination Report, Applicant Trane International Inc., dated May 18, 2010, 3 pages.
British Application No. GB0805151.8, Examination Report, Applicant Trane International Inc., dated Jun. 8, 2010, 2 pages.
The Net is the Automation, Netted Automation GmbH, Information and Communication Systems (NAICS), 2000-2002, composed by John Black, Web page—http://www.nettedautomation.com/glossary_menue/glossy_r.html, printed Jan. 20, 2008.
PCT Application No. PCT/US06/32141; filed Aug. 17, 2006; Applicant American Standard International, Inc.; International Search Report; dated Oct. 2, 2008.
PCT Application No. PCT/US06/32145; filed Aug. 17, 2006; Applicant American Standard International, Inc.; Written Opinion; dated Jun. 28, 2008.
PCT Application No. PCT/US06/32145; filed Aug. 17, 2006; Applicant American Standard International, Inc.; International Search Report; dated Jul. 2, 2008.
PCT/US2010/023758, filed Feb. 10, 2010, Applicant Trane International, Inc., International Search Report/Written Opinion dated Aug. 19, 2010, 7 pages.
British Application No. GB 0805151.8, filed Aug. 17, 2006, Applicant Trane International Inc., Examination Report dated Jun. 8, 2010, 2 pages.
*Enterprise Buildings Integrator R310*, Specification Data, Honeywell, 20 pages, Mar. 2003.
PCT Application No. PCT/US06/31863; filed Aug. 15, 2006, Applicant Trane International, Inc.; Written Opinion; dated Apr. 30, 2009.

\* cited by examiner

Chiller Status  More Status Values
To log data, select data points and click Set Up Data Logs. To view and log more data points, click More Status Values.

| Chiller Condition | Current Value | Log Data | Status | Current Value | Log Data |
|---|---|---|---|---|---|
| Chilled Water Setpoint | 40.0 °F | ☐ | Active Mode | Enabled | ☐ |
| Leaving Chilled Water | 74.0 °F | ☐ | operating Mode | Run:Normal | ☐ |
| Entering Chilled Water | 53.6 °F | ☐ | Active Cooling Output | 344 Tons | ☐ |
| Chilled Water Flow | On | ☐ | Current Draw | 68% RLA | |
| Chilled Water Pump | On | ☐ | Current Limit | 100% RLA | |
| Leaving Condenser Water | 88.4 °F | ☐ | | | |
| Entering Condenser Water | 93.4 °F | ☐ | | | |
| Condenser Water Flow | On | ☐ | | | |

Selected Data Points
[ Set Up Data Logs ]

Customize System Pages

Add/Remove Chiller Equipment Summary Data

Select to show data points on the summary page and clear to delete data points from the summary page.

View Printer-Friendly Page

| Currently Displayed | System Default | Chiller Conditions Table | | Currently Displayed | System Default | Status Table |
|---|---|---|---|---|---|---|
| ☑ | Yes | Chilled Water Setpoint | ☐ | Yes | Yes | Active Mode |
| ☑ | Yes | Leaving Chilled Water | ☑ | Yes | Yes | Operating Mode |
| ☑ | Yes | Entering Chilled Water | ☑ | Yes | Yes | Active Cooling Output |
| ☑ | Yes | Chilled Water Flow | ☑ | Yes | Yes | Current Draw |
| ☑ | Yes | Chilled Water Pump | ☑ | Yes | Yes | Current Limit |
| ☐ | No | Leaving Condenser Water | ☐ | No | No | Alt Status 1 |
| ☐ | No | Entering Condenser Water | ☐ | No | No | Alt Status 2 |
| ☐ | No | Alt Temp 1 | ☐ | No | No | Alt Status 3 |
| ☐ | No | Alt Temp 2 | ☐ | No | No | Alt Status 4 |
| | | | ☐ | No | No | Alt Status 5 |
| | | | ☐ | No | No | Alt Status 6 |

This is your last chance to go back and make changes. When you click Finish, the equipment summary pages display data selected in the list above.

[< Back]  [Finish]

You may go to any portion of the application you like by using the options at the top of the page or clicking one of the following:

Tracer ES Home
My Home
Customize System Pages

FIG. 20

BUILDING AUTOMATION SYSTEM FACILITATING USER CUSTOMIZATION

RELATED APPLICATIONS

This application is a continuation-in-part of U.S. patent application Ser. No. 11/208,773, filed on Aug. 22, 2005, entitled "Dynamically Extensible and Automatically Configurable Building Automation System and Architecture," and is also related to U.S. patent application Ser. No. 11/316,687, filed Dec. 22, 2005, entitled "Building Automation System Facilitating User Customization"; U.S. patent application Ser. No. 11/316,699, filed Dec. 22, 2005, entitled "Building Automation System Facilitating User Customization"; U.S. patent application Ser. No. 11/316,695, filed Dec. 22, 2005, entitled "Building Automation System Data Management"; U.S. patent application Ser. No. 11/316,698, filed Dec. 22, 2005, entitled "Building Automation System Data Management"; U.S. patent application Ser. No. 11/316,703, filed Dec. 22, 2005, entitled "Building Automation System Data Management"; U.S. patent application Ser. No. 11/316,697, filed Dec. 22, 2005, entitled "Building Automation System Data Management"; and U.S. patent application Ser. No. 11/316,410, filed Dec. 22, 2005, entitled "Dynamically Extensible and Automatically Configurable Building Automation System and Architecture," all of which are hereby incorporated by reference in their entireties.

FIELD OF THE INVENTION

The present invention relates generally to building automation systems. More particularly, the present invention relates to user customization of and interface with building automation system information, communications, and configurations.

BACKGROUND OF THE INVENTION

Building automation systems (BASS) are used to coordinate, manage, and automate control of diverse environmental, physical, and electrical building subsystems, particularly HVAC and climate control, but also including security, lighting, power, and the like. Typical existing BAS systems are hardwired or use a proprietary communication standard or protocol to link the various subsystems and provide system-wide user access and control.

Hardwiring and manual programming of a BAS can create a robust fixed system customized for a particular installation. These systems, however, often require extensive customization for each building or site. Necessary manual programming and other installation elements for one BAS may not be applicable to other systems, contributing to the costliness and time-consuming installation associated with such systems.

Further, hardwired systems and those using proprietary communication standards and protocols are difficult or impossible to integrate with system components, panels, and other elements from different vendors or generations. For example, a campus of buildings in which an upgraded BAS is being installed may have existing previous generation (legacy) systems and systems from more than one vendor. Installing a BAS and making it compatible with the existing systems in such a situation is time-consuming, requiring extensive manual service and programming to integrate the existing devices and implement the custom BAS. Manual service is typically provided by systems integration personnel. While systems integrators are not favorably viewed by BAS owners and managers because of the expense and interruption, systems integrators are a key aspect of the business models of many BAS manufacturers and vendors as revenue generation and on-site contact after the sale and initial installation of BASs. BAS manufacturers and vendors have therefore been reluctant to alter their models and eliminate systems integrators.

With the introduction of BACnet™, an ASHRAE (American Society of Heating, Refrigerating and Air-Conditioning Engineers) and ANSI (American National Standards Institute) protocol standard, and LonTalk™, a protocol integration approach developed by Echelon, some uniformity of standards and communications has been achieved in the industry. BACnet™ was intended to standardize HVAC interoperability and serve as a solution to industry-wide issues. In use, however, BACnet™ exists in multiple versions and includes various non-standard feature functions available to vendors. Many vendors dictate a particular BACnet™ version that must be used in order to achieve system compliance, forcing BAS users to update. BACnet™ is therefore not completely interoperable across versions and features. Further, present BASs are typically single protocol architectures. Thus, while a given BAS is "compatible" with a protocol standard, the BAS is natively compatible with only a single protocol, such as BACnet™, another standard protocol, or a proprietary protocol.

In a simplified analogy, a BAS can be compared to a bound book. Each installation of the BAS is a different reader of the book. The book may contain multiple chapters or sections and must be custom written and professionally bound for each reader. The chapters may each be written in a different language, if the BAS is compatible with multiple protocol versions or vendors. To read the various different languages that are in the book, the reader will need to manually consult a dictionary to translate each chapter into the reader's primary or preferred language. Multiple dictionaries may be needed. The reader may not be able to completely translate each language, or may only be able to translate some chapters into non-preferred languages in which the reader is merely conversant but not fluent, and therefore the reader may only obtain a basic understanding of one or more chapters. For example, one chapter of the book might be a first language representing a particular vendor's preferred or native version of BACnet™ for the BAS, while another chapter of the book represents another vendor's version of BACnet™ in a second language. If the second language is not one understood by the reader, the reader may only be able to become minimally proficient in the second language using the dictionary to translate. Without complete fluency, the book is not useful to the reader for high-level tasks or communicate effectively. Some languages may be untranslatable, requiring the reader to consult a translator to manually translate the chapter or chapters. Manual translation in particular is time-consuming and expensive, and if whole chapters are translated, the entire book must be professionally rebound to permanently incorporate the translated material. Without professional rebinding, the reader will need to repeat the manual translation the next time the book is read.

Additionally, BAS installation and maintenance are still generally labor-intensive custom tasks that vary with each system implementation. Upgrading, expanding, and updating or removing system components and services in particular are also complex tasks, as the existing BAS may or may not support new devices and must be manually reconfigured to recognize and incorporate changes. In a common scenario, a user managing a building site with two control units operating in an existing BAS wants to add a third control unit in a newly constructed wing of the building. The user must upgrade the existing control units to the new version of the third control unit in order for the system to be compliant because the system cannot accommodate multiple versions or integrate the new control unit.

Returning to the book analogy, then, when updates to chapters in the book are necessary, or when whole new chapters are added, the entire book must be returned to the original author to be rewritten and subsequently professionally rebound. Any dictionaries must also be updated accordingly and manual translations repeated. Updates and additions are therefore labor-intensive and time-consuming to accomplish.

User interfaces, typically computer-displayed graphical user interfaces (GUIs), for such BASs are typically static and compel users to perform tasks and view information in a predetermined way. Changing the way the user interface functions requires customization beyond the ability of the ordinary user, who is generally not trained in computer programming.

Existing BASs also do not offer the accessibility, customization, and management tools desired by system users. Current BASs are difficult and communicatively cumbersome to manage on a large scale, such as by a regional or nationwide retailer or other organization. Further, while Internet-based and accessible systems are presently available and in use, these systems suffer from several drawbacks. Many current Internet BASs were created as add-ons to existing BASs and thus have integrated and proprietary designs. These systems do not offer the adaptability and extensibility necessary to interface with non-native systems and sub-systems, a particular issue with respect to large-scale systems implemented in existing structures. Existing system also do not provide higher-level extensibility, configurability, and customization tools.

More recently, ASHRAE has released an XML and BACnet™ web services interface specification. According to ASHRAE, the interface is intended to be communication protocol neutral in that defined web services can be used with any underlying protocol. This approach is a least common denominator approach that can span multiple BACnet™ version specifications, wherein BAS services are supported by the intrinsic functionality of the protocol. This approach, however, still requires a gateway or translation to normalize special or proprietary functions and also requires translation or normalization between protocols rather than more smoothly running each protocol natively. Further, while the functions can be translated or normalized, data is often not given complete semantic meaning or context. In other words, while least common denominator systems can recognize data as red, blue, or green, these systems cannot recognize shades of these colors, and data loses some level of meaning when generalized to only the primary color.

Accordingly, a need remains for an intelligent BAS with available high-level user customization features and increased communication, management, and control options, particularly from a user perspective.

SUMMARY OF THE INVENTION

The present invention substantially addresses the aforementioned needs and is directed, in one embodiment, to pages in a graphical user interface (GUI) for a building automation system (BAS).

In one embodiment, a summary page for a building comprising at least a portion of the BAS includes at least one navigable link to another portion of the GUI; a static building information portion; and a dynamic building information portion. The dynamic building information portion includes an alarm list comprising static and dynamic information related to the presence or absence of an alarm in the building, and a space list comprising static and dynamic information about a plurality of spaces related to the building, wherein the static information comprises at least a space setpoint and the dynamic information comprises at least an observed condition related to the setpoint, wherein the space list is limited to displaying less than all of the plurality of spaces related to the building, and wherein the ones of the plurality of spaces selectively displayed in the space list comprise the spaces having the greatest variance between the setpoint and the observed condition.

In other embodiments, the invention is directed to space summary pages and equipment summary pages.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which:

FIG. 11B is a detail view of the user interface page of FIG. 11A according to one embodiment of the invention.

FIG. 14 is a user interface page according to one embodiment of the invention.

FIG. 20 is a user interface page according to one embodiment of the invention.

Figure 1:
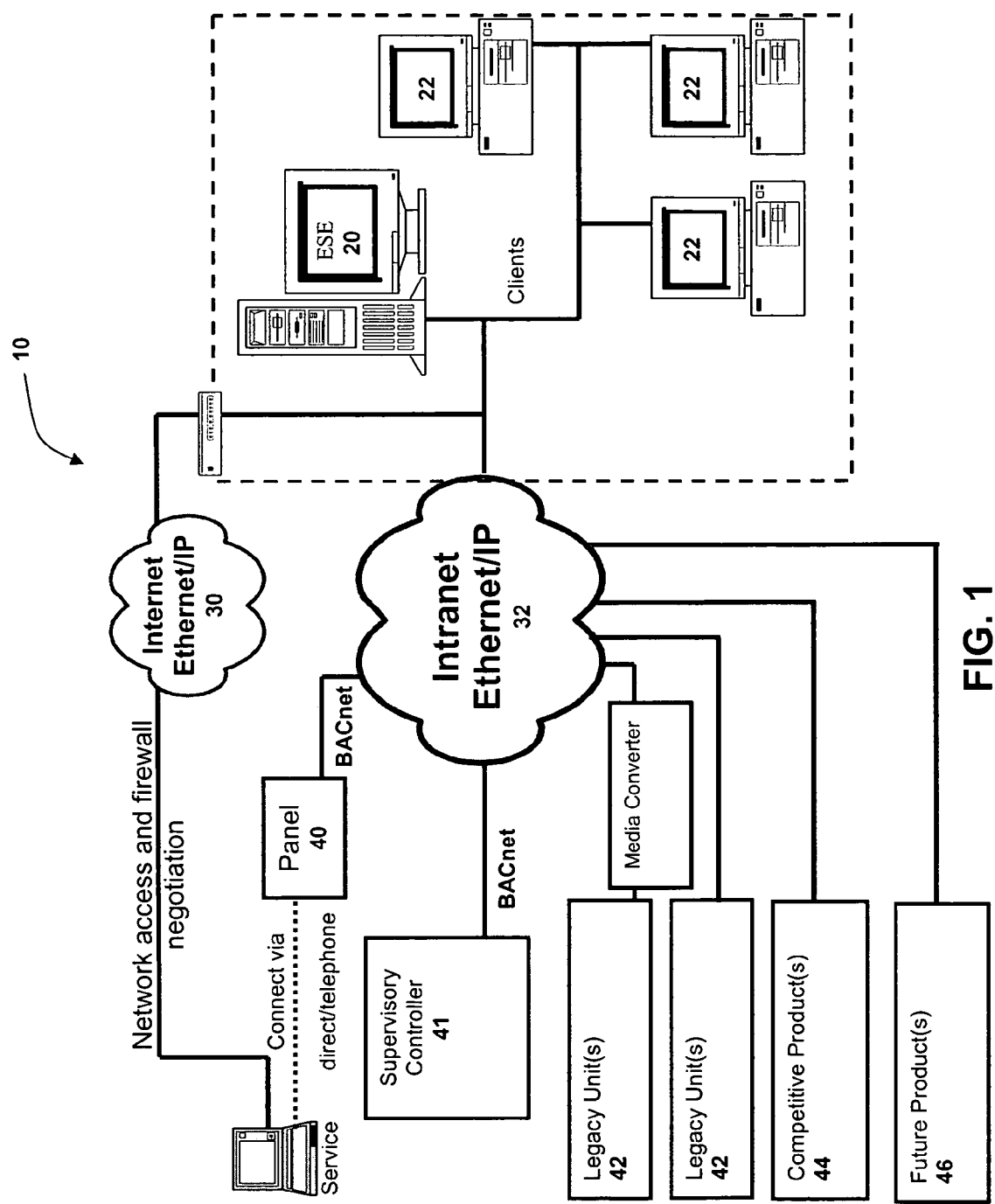
FIG. 1 is a diagram of a building automation system (BAS) according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The present invention relates to systems and methods for interacting with and customizing a dynamically extensible and automatically configurable BAS. In one embodiment, user customization options are presented by and accomplished through a graphical user interface. In addition to providing a portal through which users may access, manage, and customize the BAS, the user interface itself is customizable in accordance with and complimentary to the dynamic extensibility of the system. For example, in one embodiment when an enterprise server engine of the BAS discovers new objects, the user interface can be customized automatically or selectively at a user's direction. The user interface also allows the user to customize the hierarchical directory of sites or buildings. The sites or buildings are searchable from the user interface and the results of searches can be used to then customize the directory. The user interface also comprises a dashboard display in one embodiment to present information about building systems at a glance. The dashboard displays include summary information for buildings, for spaces within buildings, or for specific equipment in a building.

The systems and methods are particularly suited for a dynamically extensible and automatically configurable BAS and architecture, such as is disclosed in related and previously identified co-pending U.S. patent application Ser. No. 11/208,773, entitled "Dynamically Extensible and Automatically Configurable Building Automation System and Architecture," and the previously identified co-pending U.S. patent application Ser. No. 11/316,687, filed Dec. 22, 2005, entitled "Building Automation System Facilitating User Customization"; U.S. patent application Ser. No. 11/316,699, filed Dec. 22, 2005, entitled "Building Automation System Facilitating User Customization"; U.S. patent application Ser. No. 11/316,695, filed Dec. 22, 2005, entitled "Building Automation System Data Management"; U.S. patent application Ser. No. 11/316,698, filed Dec. 22, 2005, entitled "Building Automation System Data Management"; U.S. patent application Ser. No. 11/316,703, filed Dec. 22, 2005, entitled "Building Automation System Data Management"; U.S. patent application Ser. No. 11/316,697, filed Dec. 22, 2005, entitled "Building Automation System Data Management"; and U.S. patent application Ser. No. 11/316,410, filed Dec. 22, 2005, entitled "Dynamically Extensible and Automatically Configurable Building Automation System and Architecture," all of which have been incorporated herein by reference.

The invention can be more readily understood by reference to FIGS. 1-24 and the following description. While the invention is not necessarily limited to the specifically depicted application(s), the invention will be better appreciated using a discussion of exemplary embodiments in specific contexts.

Referring to FIG. 1, a user accesses and interacts with a building automation system ("system") 10 through a graphical user interface (GUI or "user interface") presented on one or more computer devices 22 in one embodiment. BAS 10 is an automatically and intelligently scalable object-oriented system in one embodiment, providing multi-site management capabilities in a local or widely distributed geographic area. In one embodiment of the present invention, an architecture of BAS 10 is anchored by an enterprise server engine (ESE) 20. BAS 10 and ESE 20 comprise a versatile and robust processor-based control system with a communications protocol-agnostic head-end that operably supports the management of HVAC and other subsystems in one or more buildings from a central location internal to or remote from any of the buildings. BAS 10 is preferably networked for user accessibility, such as via one or more computer devices 22 or any other hardware, firmware, or software user interface means communicatively coupled to a communication network. One embodiment of a user interface is described in more detail below. In one embodiment, BAS 10 is user-accessible via either or both a computer system on an Intranet 32 or the Internet 30 as a web-enabled application running on a web server. The web and network applications provide operational services for HVAC and other subsystems.

In one embodiment, BAS 10 is capable of supporting and integrating legacy, current, and next generation components and subsystems. BAS 10 is further able to support common vendor or manufacturer systems as well as competitor systems by intelligently identifying the systems and/or subsystems and facilitating integration into the dynamically extensible architecture of BAS 10. This flexibility enables the architecture of BAS 10 to support added applications and new control panel and subsystem types and versions without recompilation and reissue, and to extend, customize, and tailor BAS 10 to specific needs in a particular implementation. Further, dynamic extensibility enables a complex system to provide enhanced versatility and usability.

Returning to the aforementioned book analogy, the BAS of the present invention is a library of books, rather than a single, inflexible, permanently bound book as in the prior art. Each end device of the BAS of the invention brings its own book to the library. Each book is not bound but is rather loose-leaf, easily able to accept additions or revisions. A reader therefore does not need to rely on a single, large, inflexibly bound book that must repeatedly be rewritten and rebound to accommodate update or additions and that comprises chapters in multiple languages requiring translation according to a potentially limited dictionary or by a manual translator. Instead, the library includes a multi-lingual librarian (the ESE) to access individual books as needed, wherein the books are always up-to-date. As new books are added to the library, existing books are automatically updated by the librarian to incorporate information gleaned from the newer material. Further, the library includes a card catalog that not only describes the individual books but references interrelations and similarities among multiple books in the library. The card catalog is also automatically updated as new books are added to the library. The BAS of the invention essentially creates an automated librarian who can consult an individual book, speak any necessary language, and learn new languages on the fly, as needed. This way the BAS of the invention can be thought of as an infinite or universal Turing machine, whereas previous BASs can only be classified as finite machines.

Referring again to FIG. 1, each device 22 is communicatively coupled with BAS 10, which is preferably a dynamically extensible and customizable BAS. The dynamic extensibility of BAS 10 enables a user to utilize the user interface to customize and control BAS 10 without the need for reprogramming or recompiling code.

The user interface of BAS 10 may be provided by virtually any device 22 with a visual display and a communicative connection to BAS 10. Some examples of such devices are a personal desktop, laptop, or portable computer (PC); a portable or personal digital assistant (PDA); a cellular phone; and other similar devices. Typically, the connection between device 22 and BAS 10 is provided by the Internet 30, an Intranet system 32, and/or some other local or wide area communication network, although other means of connection and combinations of connections are also possible. For example, if an Internet-enabled cellular phone is used, the connection comprises, at least in part, a wireless cellular communication network.

Within BAS 10, an enterprise server engine (ESE) 20 operably provides a communicative link between device(s) 22 and one or more field devices, end devices, and/or control/sensor means 40, 41, 42, 44, and 46 within BAS 10 to implement installation, setup, integration, control, and support functions and tasks. For example, ESE 20 provides an interface for device/object 40, 42, 44, and 46 setup parameters, including IP address, subnet mask, gateway, and name of server for each, where applicable. ESE 20 further provides a methodology and/or utility to set up and customize user interface 160 web pages, which can include both templates and individual pages, and to serve and publish graphics and content to web pages.

In one embodiment, ESE 20 comprises software, firmware, hardware, and/or other programming means for selectively implementing a dynamic extensibility capability for the BAS that establishes communications with and control of the plurality of end devices over the plurality of communication protocols, for selectively implementing an automatic configuration capability for the BAS that supports addition of end devices to the plurality of end devices by determining at least one characteristic of each end device, and for assembling a relational directory of at least a portion of the plurality of end devices based at least in part on the at least one characteristic. In another embodiment, ESE 20 comprises hardware, firmware, and/or software programming means for assembling static and dynamic information about at least a portion of the plurality of end devices and about the spaces, systems, subsystems, buildings, campuses associated with the plurality of end devices, and software, firmware, and/or hardware database means for storing the static and dynamic information and the at least one characteristic of each end device The database means may also store a relational directory. These and other features of ESE 20 are described in more detail below.

Figure 2:
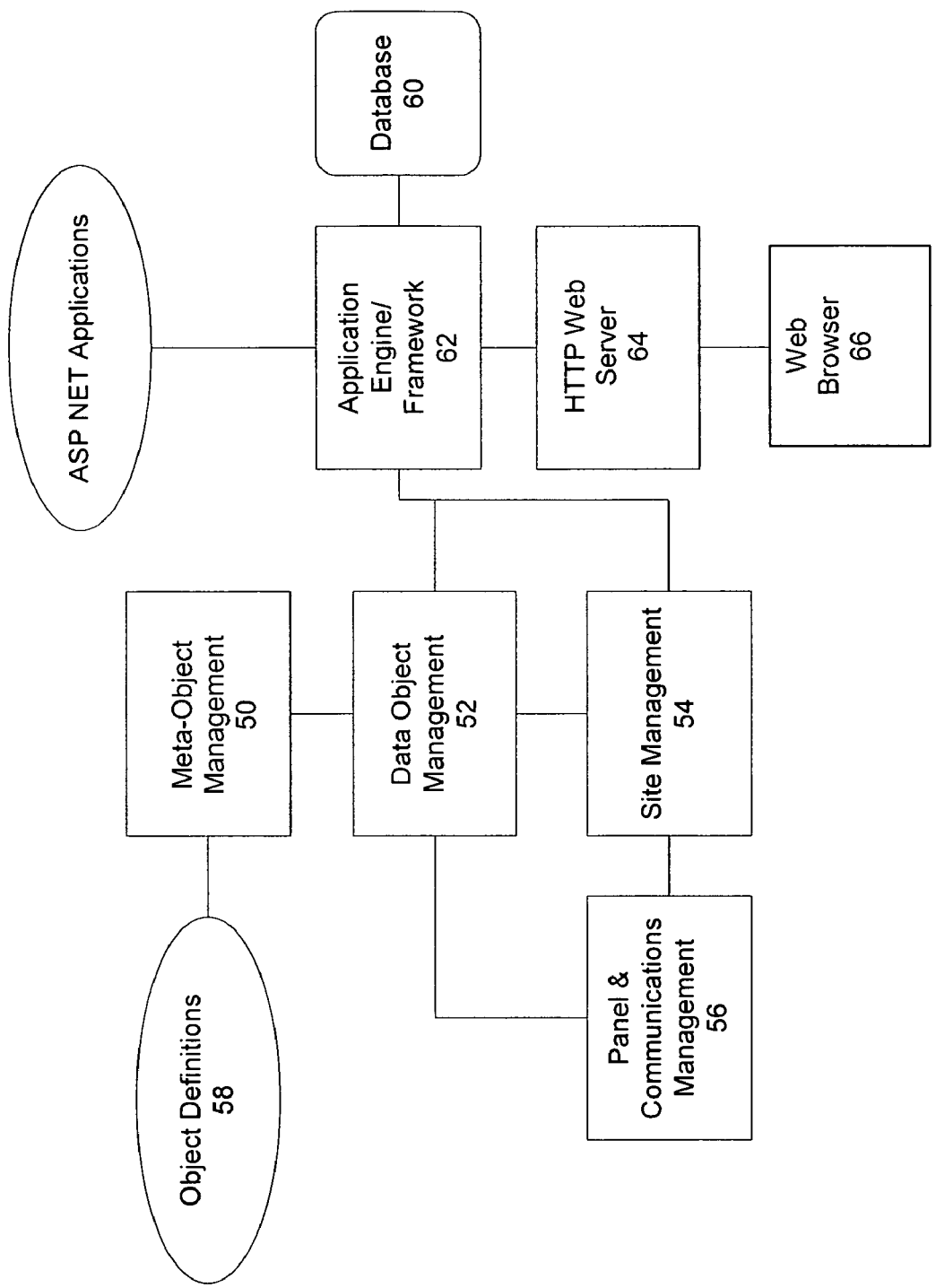
FIG. 2 is an operating architecture diagram of a BAS according to one embodiment of the invention.

FIG. 2 is a diagram of an operating architecture of BAS 10 according to one embodiment. In dynamically extensible and scalable BAS 10, which is described in more detail in related U.S. application Ser. No. 11/208,773, which is incorporated herein by reference, objects exist in a hierarchical or class structure. For example, data objects, site objects, and panel objects are interrelated and can be relatively defined, with the objects including or associated with respective object definitions 58, such as type, version, vendor, and the like, that are stored in a database 60 and interpreted by BAS 10 within an application engine/framework 62 with ESE 20 to determine how the particular object is to be handled by BAS 10. Internal meta-object management 50, data object management 52, site management 54, and panel and communications management 56 representations interface application engine/framework 62 with external sources and entities to manage objects within BAS 10. A web server 64 then interfaces with BAS 10 via application engine/framework 62 to an external interface. The external user interface according to one embodiment of the invention is presented via an Internet 30, intranet 32, or other communication network using a web browser 66.

Figure 3:
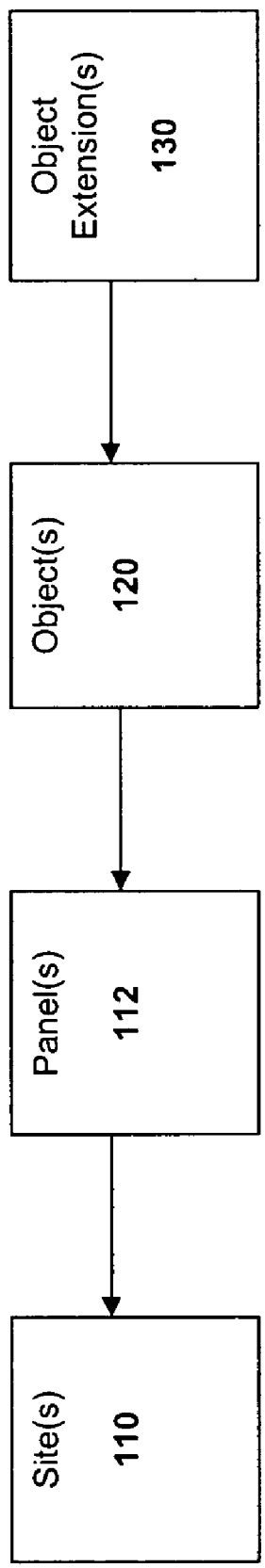
FIG. 3 is a data model block diagram of a BAS according to one embodiment of the invention.

The main data entities of BAS 10 are depicted in FIG. 3. At a very basic level, each site 110 is a collection of one or more panels 112 (panel objects), and each panel 112 is a collection of one or more objects, which may need extensions 130 for operability within BAS 10. Site 110 can be an individual site, i.e., a single building, or a list of sites managed by ESE 20. Site 110 also includes information for background tasks. Panel(s) 112 is a single panel 112 or a list of panels known for site 110 and the information needed by ESE 20 to manage those particular panels. This information can include panel type, version, vendor, and ignore flags in one embodiment. Object(s) 120 is a list of objects that exist in each panel 112 and is used for navigation, display, and management. Object extension(s) 130 is information kept on ESE 20 that is specific for each object 120 as described by the metadata associated with object 120. Object extensions 130, for example, are used to drive user interface 160 for determining things such as to which family a specific object belongs when an object is in a different family by the object configuration.

Integration of site 110 or object 120 into BAS 10 is accomplished via a discovery process in one embodiment, which is summarized herein and described in more detail in related U.S. application Ser. No. 11/208,773, which has been incorporated herein by reference. For example, a new panel object 112 (panel 40 in FIG. 1) is installed at a location and is to be incorporated into BAS 10. ESE 20 operably executes one or more algorithms that discover the new panel object 112 (panel 40) within BAS 10 and subsequently analyze existing programming to first determine whether panel object 112 is in fact new, or whether panel object 112 was previously discovered within BAS 10. Upon determining that panel object 112 is a new addition, ESE 20 subsequently obtains any relevant or necessary information, such as vendor, version, and supported protocol(s), from and about panel object 112 in order for panel 40 to be integrated into BAS 10 and performs on-going reconfiguration. In other embodiments, integration of site 110 or object 120 into BAS 10 is manually initiated and/or accomplished.

During a discovery or manual integration process, ESE 20 may obtain a high or low level of information about an object. In one situation, a first newly discovered object is determined by ESE 20 to be a familiar object, such as from a common vendor or one that is similar to or the same as one or more known objects within BAS 10. This determination is generally made by ESE 20 based at least in part upon information provided by the discovered, self-describing object. ESE 20 is therefore be able to obtain or learn a higher level of information about the first newly discovered object and establish more sophisticated communications with the object, automatically and without user intervention. A second newly discovered object, in contrast, may be unfamiliar to ESE 20 or less familiar than the first discovered object because the second object is associated with a different vendor, operates a new version, or has some other characteristic that has not previously been incorporated into BAS 10. Generally, ESE 20 is able to establish communications, albeit lower level, with objects like the second newly discovered object. User-supplied information may be necessary, however, to add an unfamiliar object to BAS 10 or to supplement information obtained during the discovery process in order to establish higher level or even basic communications.

Further, user-supplied information may optionally and selectively be provided to BAS 10, in particular ESE 20, for user convenience and management purposes. For example, in one embodiment BAS 10 and ESE 20 also allow user definition of attributes for a given site for grouping or other purposes. In one embodiment, at a minimum, each site 110 is associated with a geographical and a type attribute and a search function is provided to allow users to search for sites or groups of sites. ESE 20 further preferably accommodates the addition, removal, and general management of entire sites 110 within BAS 10.

These and other customization and management tasks are carried out by a user through the user interface. In general, the user interface is visually presented by device 22, communicatively facilitated by ESE 20. The user interface presents BAS 10 information relevant to buildings, sites, or spaces managed by BAS 10 in the form of linked web-enabled pages including interactive tables with buttons and links. Referring also to FIG. 2, device 22 includes web browser 66, which is operatively, communicatively coupled with web server 64, to load and display the user interface.

General information about spaces within buildings in BAS 10 typically includes the types of equipment in the space, temperature, setpoints, variance from setpoints, and whether equipment is providing heating or cooling. Specialized or custom equipment may provide other information. Some or all of the general information is available for viewing in the user interface. The information displayed can also be updated to current status by activating a button. Other building spaces can be accessed through links to navigate within the user interface. The user interface can be tailored to a specific end device being represented. For example, ESE 20 and the user interface can assemble information from definitions provided to ESE 20, from self-describing end devices, from information read from end devices, and from manually programmed end devices to create user interface pages. The pages can be created from templates, with elements and information added or removed according to the assembled information.

Typical conditions describing the spaces include temperature, flow rates, occupancy, modes (heating or cooling), equipment status, and outdoor air temperature and humidity. Equipment conditions refer to the condition of specific equipment in a space. Equipment can be viewed individually or as part of subsystem groups. Information about a subsystem group, for example, can be displayed in the user interface directly, such as in a tabular form with links to the specific equipment in the group. More information about equipment conditions can be accessed through links. The collection of data can also be user customized. Other space conditions and values may be viewed by following intuitive links. In one embodiment, information pertaining to BAS 10 can be manually updated by a user through the user interface.

Figure 4:
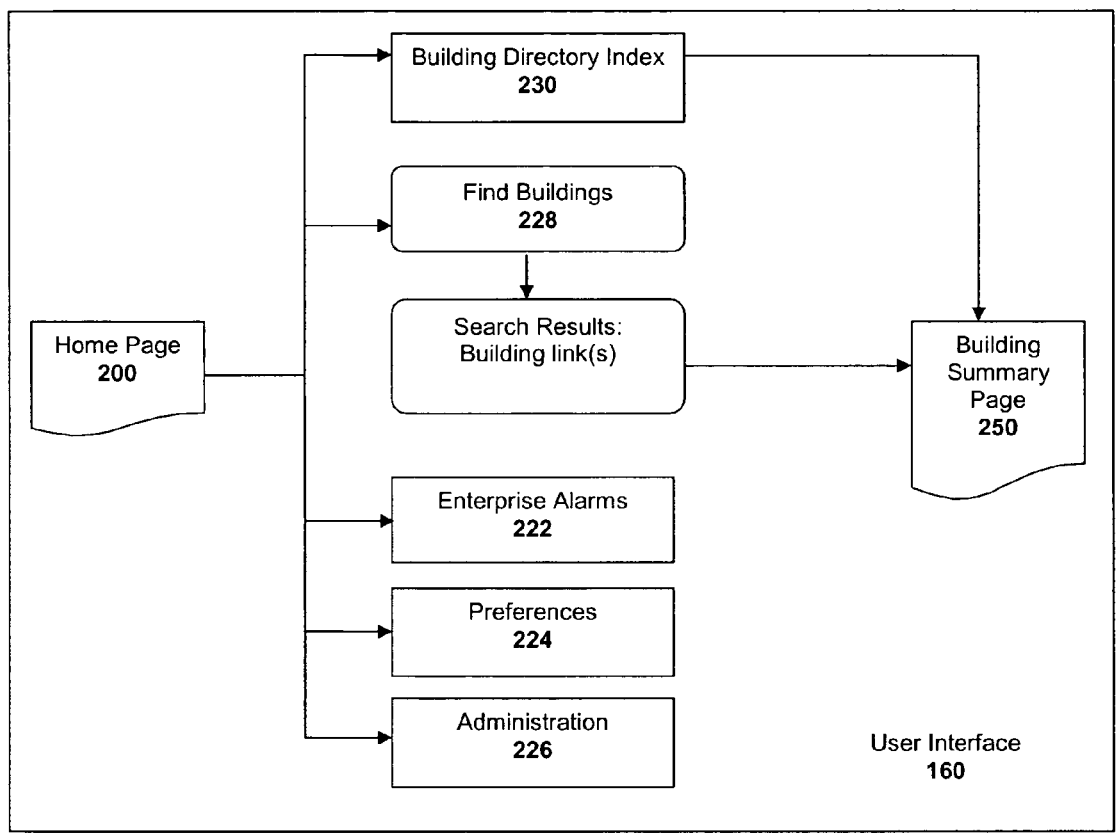
FIG. 4 is a navigation diagram of a user interface according to one embodiment of the invention.
Figure 5A:
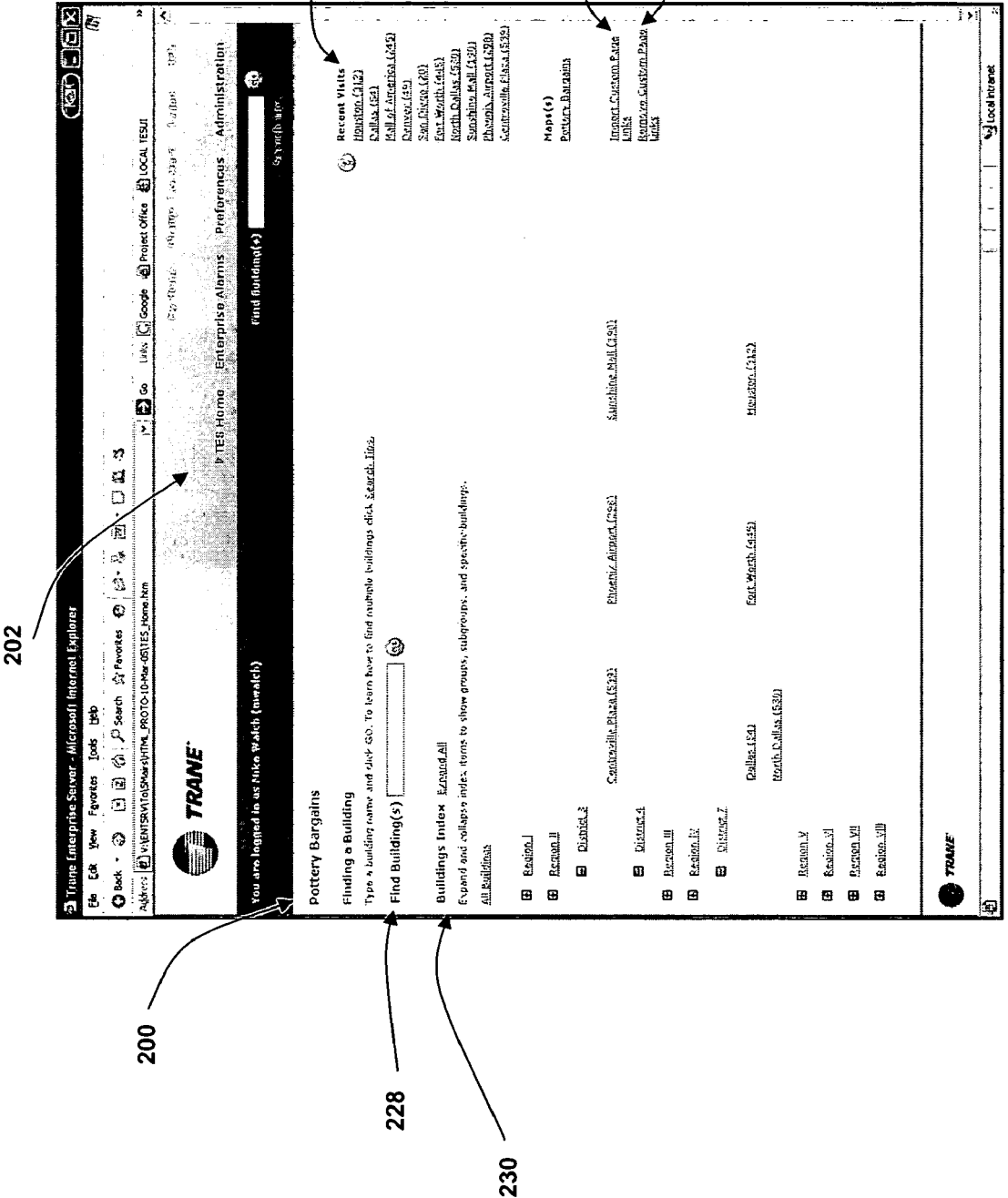
FIG. 5A is a user interface page according to one embodiment of the invention.
Figure 5B:
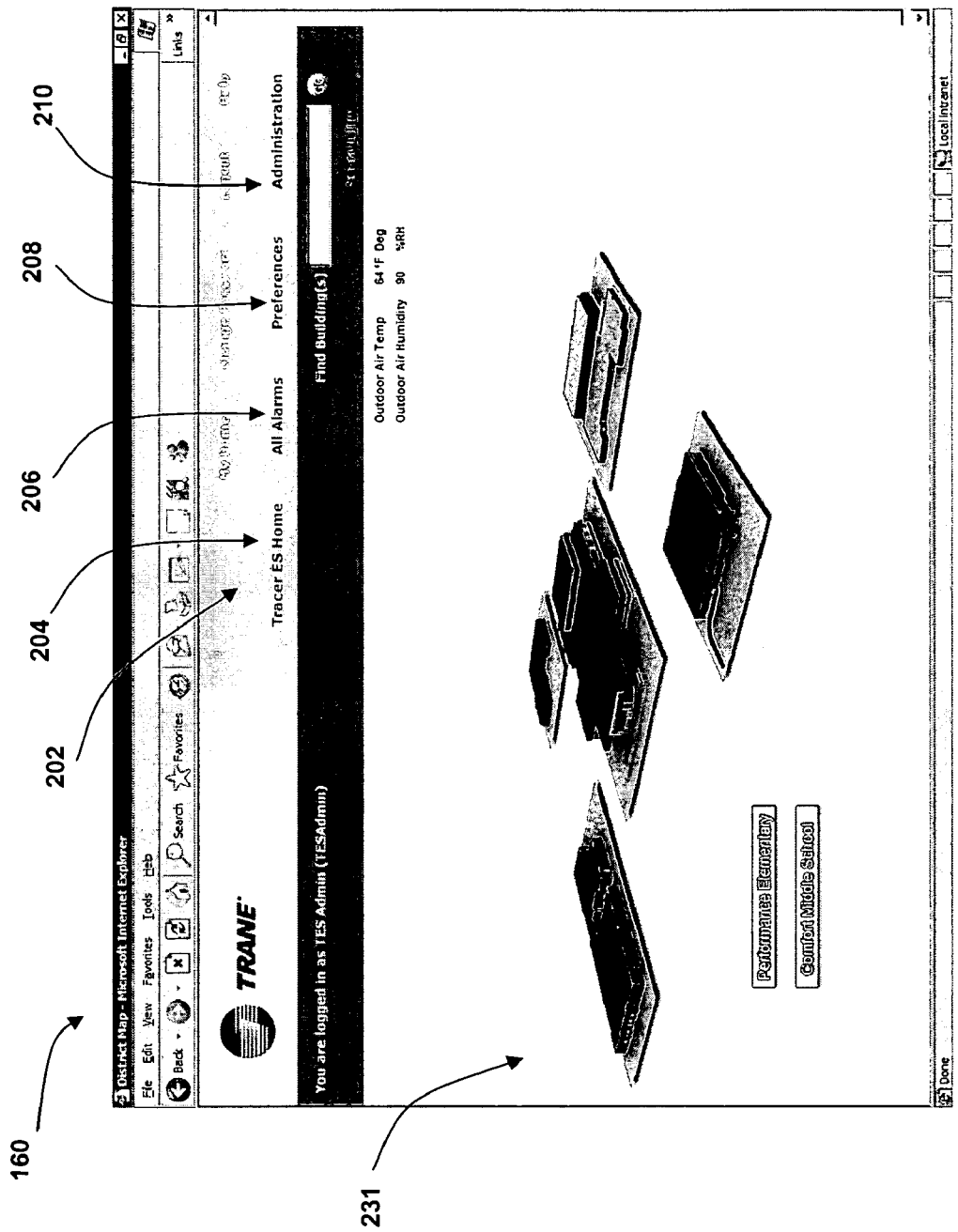
FIG. 5B is another user interface page according to one embodiment of the invention.

Referring to FIGS. 4, 5A, and 5B, one embodiment of user interface 160 includes a home or main page 200 from which a plurality of additional pages can be accessed. Information displayed on the pages accessible via user interface 160 generally relates to certain broad categories, such as data points relevant to the status of spaces and equipment. Information can also be organized by priority in pages that show various alarms triggered by space and equipment conditions that vary from predetermined standards. The information and pages include, at a high level within BAS 10, content such as a hierarchical building index or relational directory 230 and a find buildings feature 228, and a set of navigation tables 202. Directory 230 is a navigable directory of pages within user interface 160. Navigation tabs 202 are not unique to home page 200 and will generally be provided on most pages within user interface 160 to enable quick and efficient navigation. Tabs 202 include a user interface home page tab 204, an enterprise alarms tab 206, a user preferences tab 208, and an administration tab 210. In accordance with the user customizability of user interface 160, in other embodiments home page 200 can include additional, fewer, and/or other tabs as a user desires. Other options related to the general customization of the display and behavior of user interface 160 itself are also available.

The portions of user interface 160 accessible via tabs 222, 224, and 226 are relevant to the overall navigation and functionality of user interface 160. Home page tab 204 provides a convenient link back to home page 200 during user navigation within user interface 160. Alarms tab 206 corresponds with alarm portion 222, preference tab 208 corresponds with preferences portion 224, and administration tab 210 corresponds with administration portion 226, which are described in more detail below. Through these portions, pages, tabs, and user interface 160 in general, a user can navigate within interface 160 and can add, edit, categorize, customize, and control BAS 10 by executing commands, often initiated by command buttons or links within pages. Activating these buttons navigates the user within one or more pages through which the user may carry out tasks and effect a wide variety of customizations. A user can also customize the behaviors and operation of user interface 160 itself.

The features described above may be illustrated by reference to the following examples of how user interface 160 may be navigated and utilized to customize and control BAS 10. In one embodiment, after connecting with BAS 10 and completing any required security routines, such as logging in, password input, and authentication of credentials, a user reaches home page 200.

Home page 200 has many general features in common with other pages of user interface 160, including linking, manipulating data onscreen, and providing an interface through which BAS 10 may be customized. Home page 200, like other pages seen by a user, includes both content, such as buildings index 230, and navigation tools, such as tabs 202. In the particular case of index 230, content and navigation tools are integrated, as buildings within index 230 are displayed as hyperlinks that direct a user to a building summary page for the selected building. Building summary pages are described in more detail below.

Instead of or in addition to the hyperlinks of index 230, home page 200 may include a navigable customized graphic, such as building map 231 depicted in FIG. 5B. Map 231 can be integrated with index 230, depicted on a distinct page reachable by hyperlink from home page 200 (as shown in FIGS. 5A and 5B), or depicted on home page 200 instead of textual index 230 in various embodiments of the invention.

Map 231 is preferably navigable, wherein a user may select a particular building to be directed to that building's page.

Home page 200 includes a search input field 228 for executing searches of building directory 230 and its subdirectories. Interface 160, by web server 64 and browser 66 in cooperation with a database, can cache user visits to an interactions with specific pages and directories and provide a list 238 of this cached information to enable a user to quickly return to a frequently visited page. Interface 160 also permits a user to import custom page links by a link 242 on home page 200. Custom links can also be removed through link 244.

Building index 230 is a dynamically extensible and customizable content and navigation feature of home page 200. Index 230 is preferably organized hierarchically or in some other manner intuitive to or specified by a user. For example, user interface 160 by default can list buildings alphabetically. With minimal information from a user, however, user interface 160 can group buildings geographically, such as by ZIP code. A user may also customize index 230 by specifying another attribute by which to arrange the buildings, such as a name, term, or building number. In a school district, buildings can be arranged by user-specified type, such as primary, elementary, and high school. A user can then easily locate and select a building from the directory by clicking a link to that building, either directly or after expanding the index directory until the building of interest is found.

Alternatively, a user may use find field 228 to search for and locate system buildings in a searchable database. In one embodiment, if a user enters a search term or string in field 228 and an exact match is found, user interface 160 will display a building summary page for the match. Building summary pages are described in more detail below.

Figure 7A:
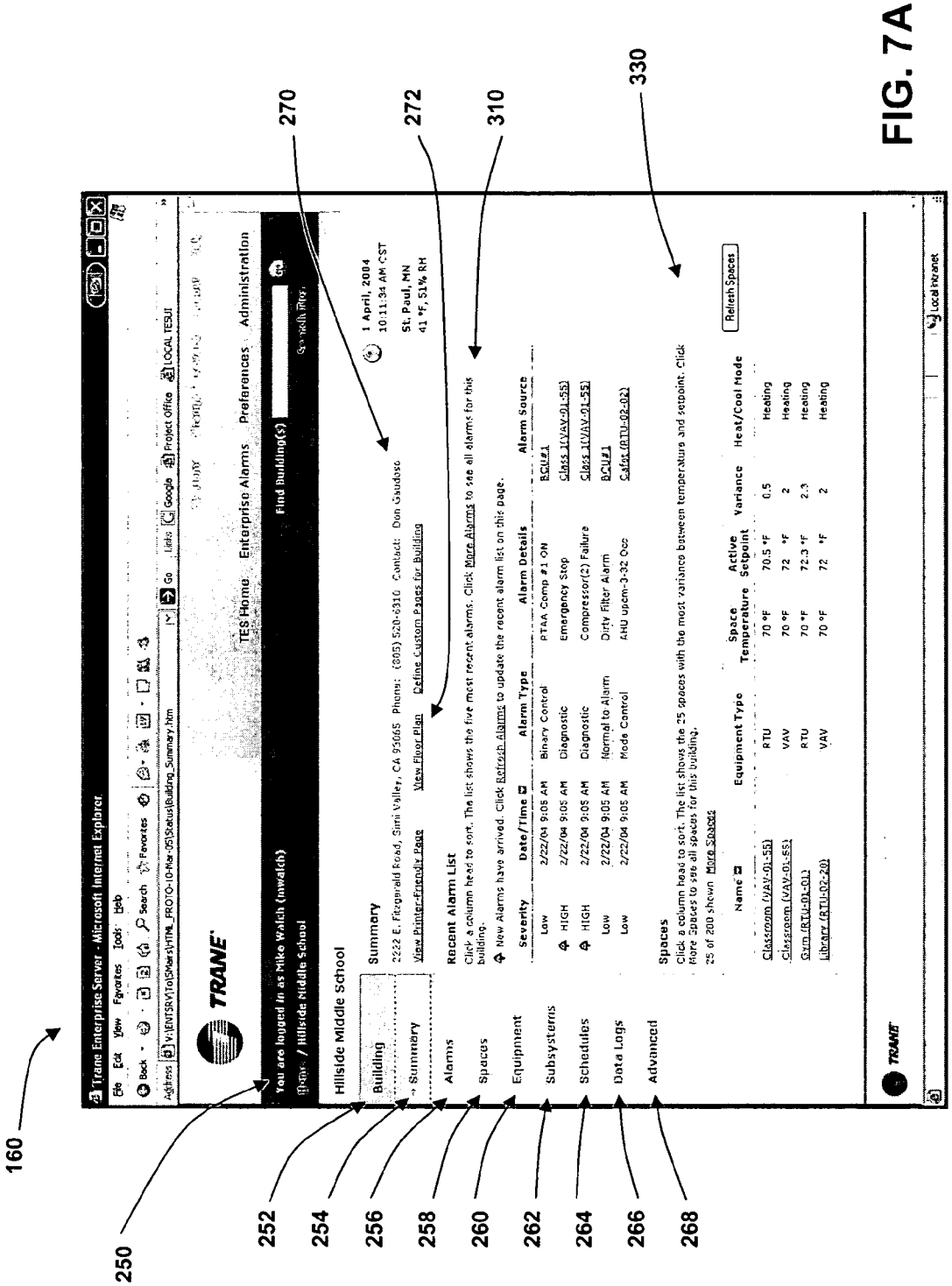
FIG. 7A is another user interface page according to one embodiment of the invention.

In one embodiment when a building link within directory 230 or map 231 has been selected, a user is directed to a building-specific summary page 250 as shown in FIG. 7A. Similar to home page 200, building summary page 250 includes content and navigation tools. Navigation tools include building information tabs 252. Building information tabs 252 include a summary tab 254, which links to summary page 250; an alarms tab 256; a spaces tab 258; an equipment tab 260; a subsystems tab 262; a schedules tab 264; a data logs tab 266; and an advanced tab 268. These tabs and the information to which each links within user interface 160 will be described in more detail below, but generally are presented on a plurality of pages within user interface 160 that include similar content in order to provide a consistent, easily navigable format. Building information tabs 250 are preferably dynamic, based upon the data and information discovered and/or available for the particular building featured on summary page 250, or the particular space or equipment on other pages of user interface 160.

In general, the content of building summary page 250 relates to building equipment and building spaces. Building equipment includes panels, HVAC units, and other electrical and mechanical systems related to operations within the building. Building spaces are rooms, floors, or other areas within the building that are managed, controlled, or affected by the equipment. Both spaces and equipment are relevant to the operation of BAS 10 and are of interest to users of user interface 160.

In particular, the content of building summary page 250, and other pages of user interface 160, includes status critical information. The content of summary page 250 therefore includes an alarm summary portion 310 and a spaces summary portion 330 in one embodiment to quickly synopsize events and provide status items of note to users. User interface 160 intuitively presents certain status critical information in proximity to other related or important information.

Figure 7B:
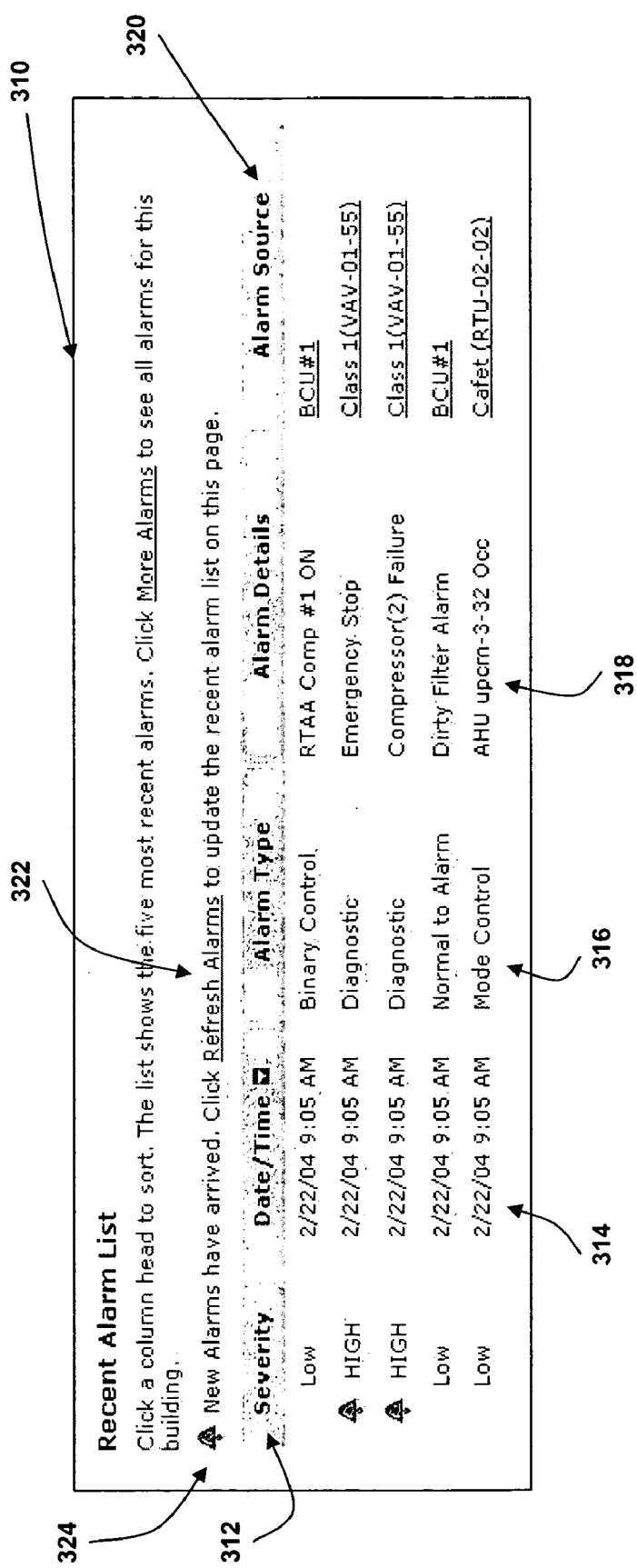
FIG. 7B is a detail view of the user interface page of FIG. 7A according to one embodiment of the invention.

Referring to FIG. 7B, alarm summary portion 310 includes alarms associated with the building summarized on page 250 of FIG. 7A. Summary portion 310 provides a tabular organization of more detailed information related to each alarm that improves a user's ability to assess and respond to alarms, including an alarm severity level 312, occurrence time 314, type 316, alarm details 318, and an alarm source 320. Within alarm summary portion 310, relevant equipment and information can be automatically hyperlinked to other portions of user interface 160. For example, alarm source 320 can be hyperlinked to an equipment summary page (refer, for example, to FIGS. 11A and 11B and the related discussion below) for the equipment from which the alarm is originating.

Figure 7C:
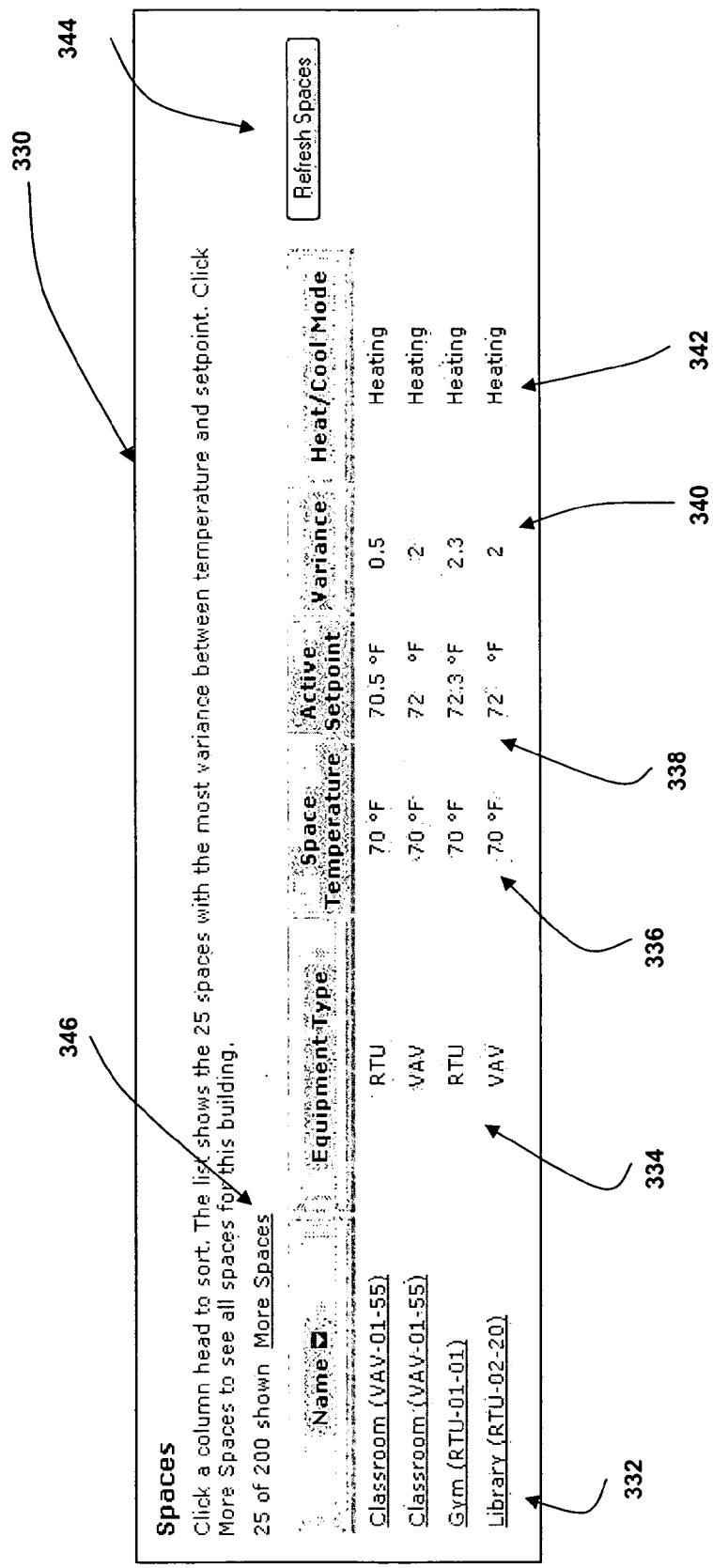
FIG. 7C is another detail view of the user interface page of FIG. 7A according to one embodiment of the invention.

Referring to FIG. 7C, spaces summary portion 330 includes information related to spaces within the building of summary page 250 to enable to a user to view current settings, view current status and operations, and quickly link to more detailed information about a space. Spaces summary portion 330 includes a user customizable space name 332, an equipment type identifier 334, a sensed space temperature 336, a current space temperature setpoint 338, a calculated variance 340, and an operational mode 342. Calculated variance 340 is a difference between current space setpoint 338 and sensed space temperature 336.

In FIG. 7C, spaces summary portion lists the twenty-five spaces having the greatest variance between setpoint and sensed temperature (not all twenty-five are visible in the screenshot of FIGS. 7A and 7C). The degree of variance from setpoint directs the user's attention to space conditions most likely to require attention. A user can specify that more or fewer spaces be included in spaces summary portion 330 by selecting a link 346. In other embodiments of the invention, and according to the user customization features of user interface 160, a user can specify which particular spaces are summarized in spaces summary portion 330, rather than including spaces based upon a setpoint variance.

Figure 7D:
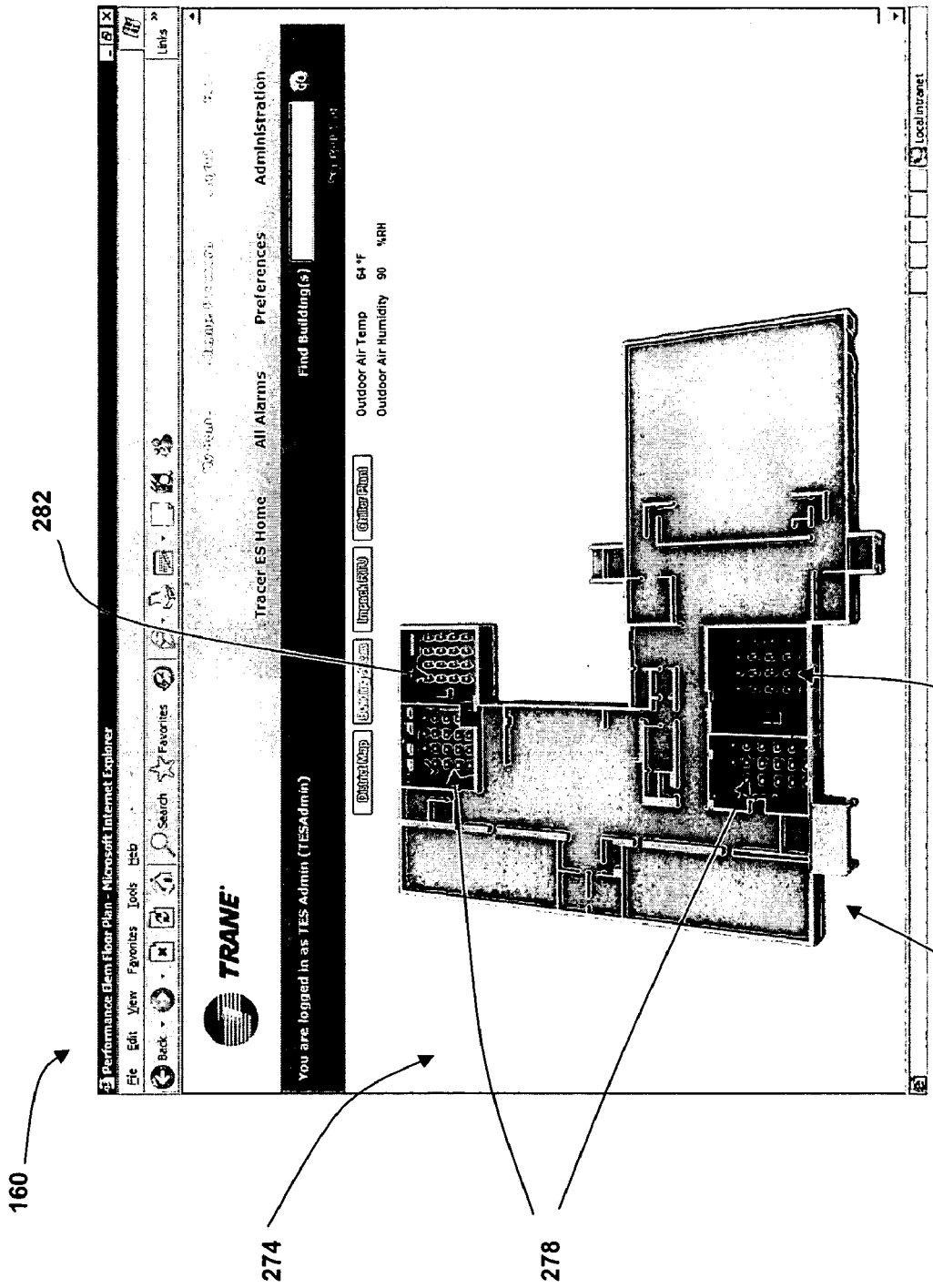
FIG. 7D is another user interface page according to one embodiment of the invention.

Referring to FIGS. 7A-D, the content of page 250 can include both static and dynamic information related to the building. Static information includes a building's location and contact information 270 in one embodiment. Static and dynamic information can also be integrated on a building floor plan reachable through floor plan link 272. In FIG. 7D, a building floor plan page 274 comprises a static building layout diagram 276 that includes dynamic building space status information in one embodiment. For example, occupied rooms 278 can be depicted in a first color, while a room 280 associated with an alarm or registering a comfort complaint within BAS 10 can be shown in a second color. Another room 282 for which a status has been altered or a comfort complaint remedied can be highlighted in yet another color by which a user can quickly locate a relevant space and determine a current status at a glance. A particular room may then be selected to reach a space page, equipment page, or alarm log, for example.

Dynamic information included on summary page 250, floor plan page 274, and other pages within user interface 160 can be updated in a plurality of ways. On page 250, alarm summary portion 310 and space summary portion 330 include dynamic information which can be automatically updated, or refreshed, periodically. In one embodiment, the dynamic information can be updated by BAS 10 and ESE 20 every ten minutes, although a more or less frequent refresh may occur in other embodiments or may be user-defined within set parameters. More frequent updates place a higher burden on BAS 10 and therefore, in one embodiment, a user may select from refresh rates predetermined not to have a detrimental affect on BAS 10 performance.

Dynamic information may be updated on demand. An on-demand refresh of alarm summary portion 310 can be user initiated by activating a refresh alarms link 322, and an on-demand refresh of spaces summary portion 330 can be initiated by activating refresh spaces link 344. Certain priority features of user interface 160, like alarms, which are important to the performance, safety, and integrity of BAS 10 operation, are associated with an automatic and dynamic prompt, such as new alarms prompt 324. To minimize impact on BAS 10 bandwidth performance, ESE 20 can provide prompt 314, alerting a user that a manual refresh may be helpful, rather than frequently updating alarm summary portion 310 even if no updated information is available.

Figure 8:
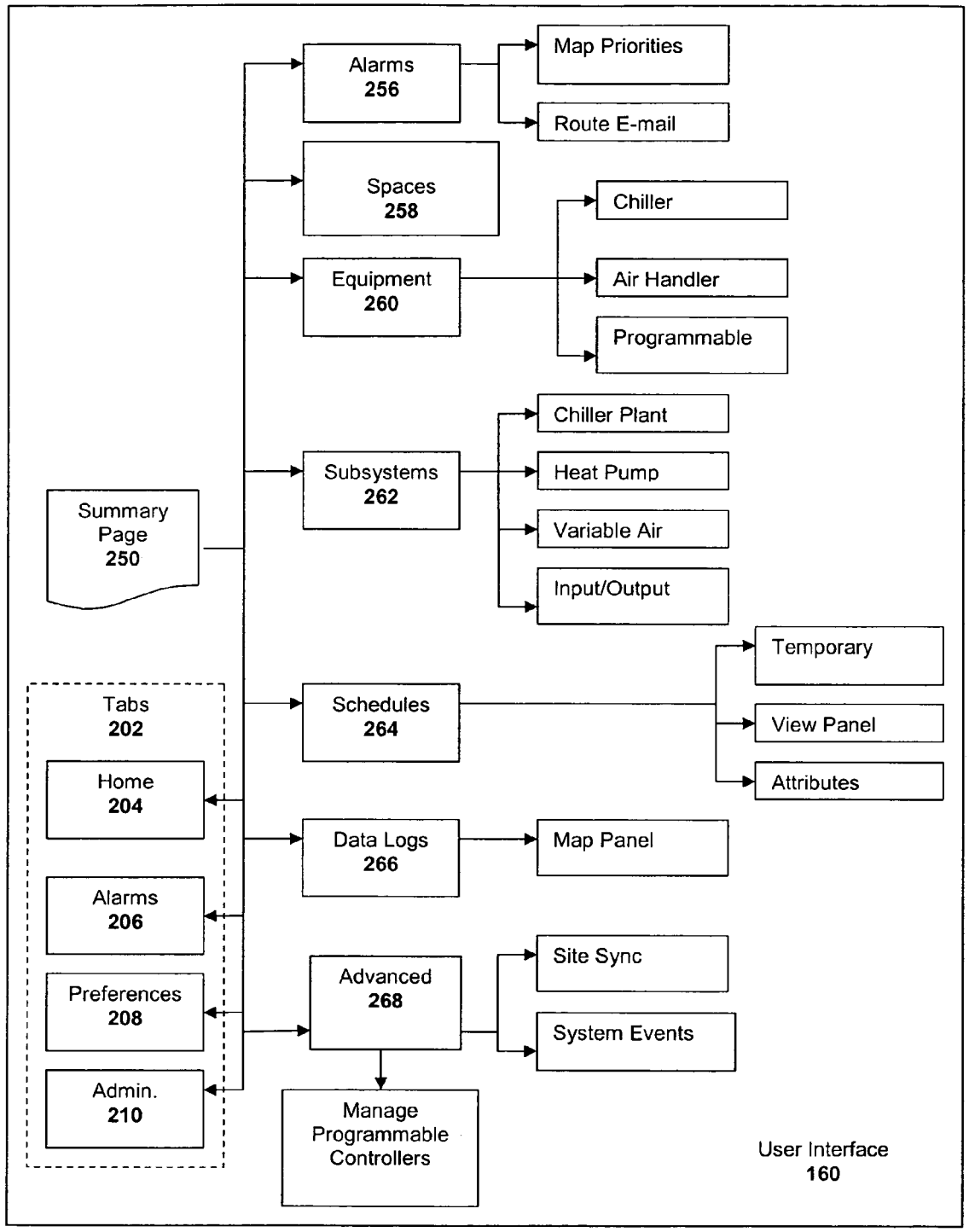
FIG. 8 is a user interface navigation diagram according to one embodiment of the invention.
Figure 9A:
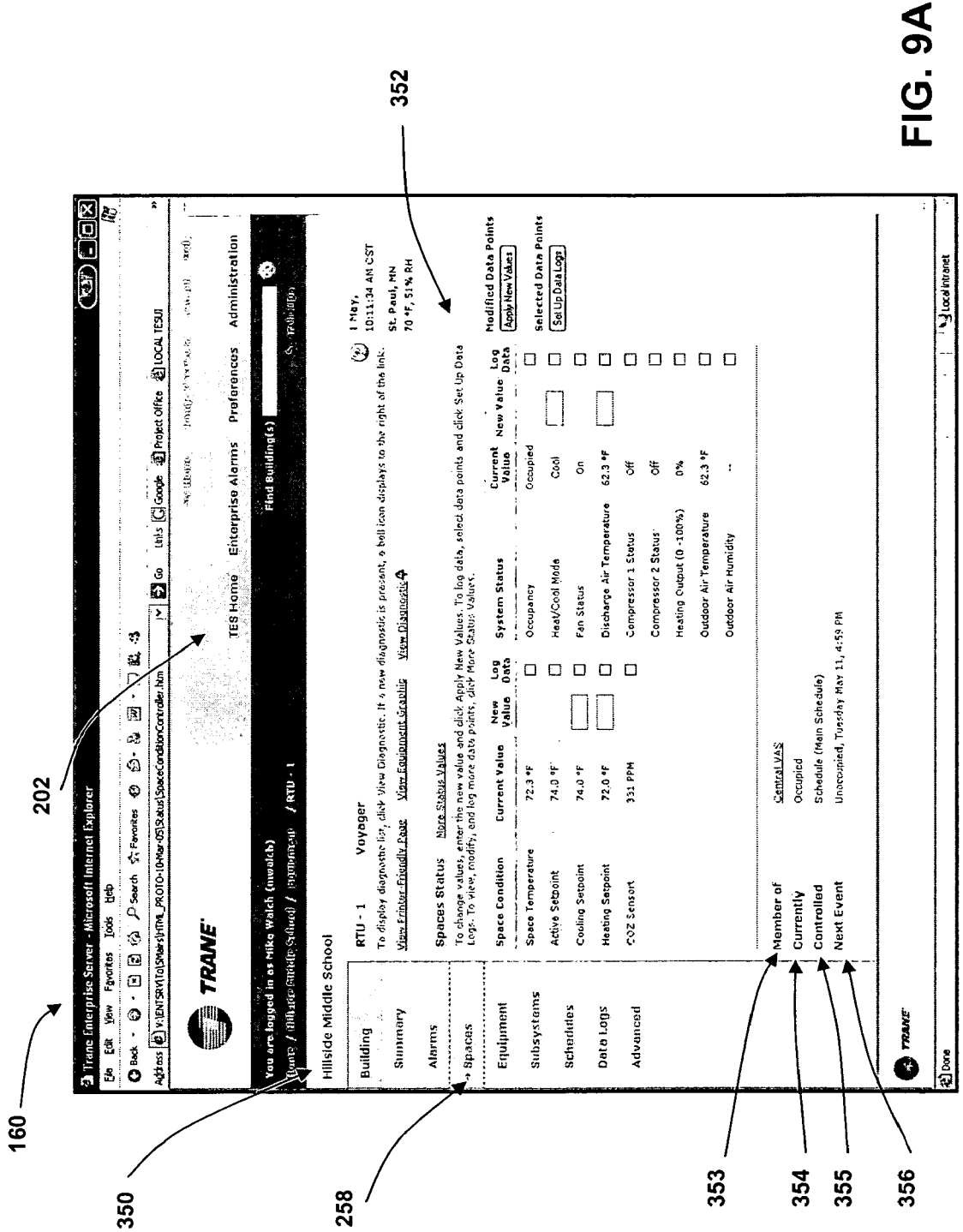
FIG. 9A is a user interface page according to one embodiment of the invention.

From summary page 250, a user may access yet more detailed information about the spaces of the selected building. FIG. 8 shows schematically how a user can navigate from summary page 250 in one embodiment of the invention. From summary page 250 and other pages displayed by user interface 160, vertical tabs alarms 256, spaces 258, equipment 260, subsystems 262, schedules 264, data logs 266, and advanced 268 provide quick navigation links. As previously mentioned, a user can navigate from within alarm summary portion 310 and spaces summary portion 230 of building summary page 250. For example, selecting a space (332) from spaces summary portion 230 takes a user to a spaces page associated with the selected space. An example spaces page 350 is depicted in FIG. 9A. Spaces page 350 includes a spaces status table 352, shown in detail in FIG. 9B, which lists information about the subject space.

Within BAS 10, spaces can be grouped and defined according to BAS 10 default rules or user customized rules, and this information can be presented at-a-glance proximate status critical and other important information regarding equipment, or a building, space, system, or subsystem. Refer also to the discussion above regarding home page 200 and building index 230, and to page 380 of FIG. 11A and page 394 of FIG. 12. For example, a nation-wide retailer may choose to group its stores by geographic or sales region, by store type or format, by time zone, or by some other characteristic. BAS 10 may default to grouping spaces by geographic location. In one embodiment, a current group to which the subject space of page 350 belongs is provided as a group link 353 next to the heading "Member Of." Group link 353 can also be used to determine what or whom is responsible for a particular building, space, equipment, or system. Link 353 also provides navigation to other group members and information. Group information may be dynamically discovered by ESE 20 if group, parent, and/or child information is provided, shown, or exposed during set-up or discovery. A user is therefore able to quickly ascertain the relevant group to which a space belongs and, by selecting group link 353, retrieve a page of user interface 160 that provides a group summary and group editing capabilities. By way of example, the national retailer previously mentioned could edit the setpoints related to all of its locations in a particular time zone to accommodate an earlier opening time for a holiday sale by changing the values group-wide on a single page, rather than editing the information individually for each group member.

Figure 6:
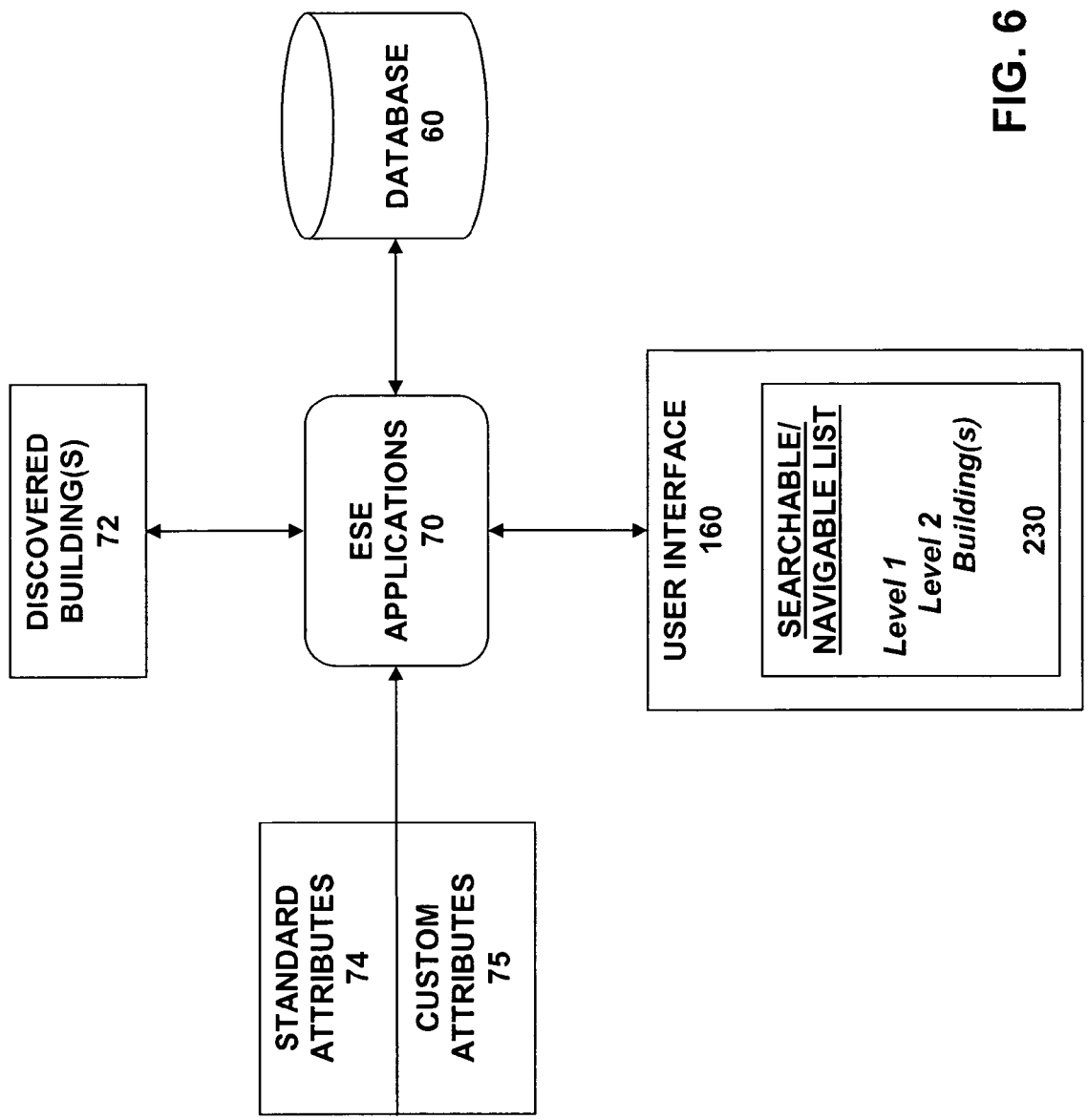
FIG. 6 is an attribute diagram according to one embodiment of the invention.

A user can also dynamically create and edit groups, as the group assignments are not fixed and do not require customized programming. Referring also to FIGS. 1 and 6, ESE 20 operating application 70 discovers buildings 72. Through the discovery process, ESE 20 learns standard attributes 74 about the building and its panels and equipment. Standard attributes 74 are stored in database 60. ESE 20 and applications 70 then can formulate a default building index 230 based upon standard attributes. As mentioned above, a user can provide custom attributes 75 to ESE 20 and applications 70 via user interface 160. Custom attributes are also stored in database 60. A user can then specify at any time a custom building index 230 based on custom attributes 75 or a combination of standard attributes 74 and custom attributes 75. Index 230 and related groups can be changed and immediately implemented by ESE 20 for display in user interface 160 should an attribute 74, 75 be edited or updated or a new building discovered. Further, ESE 20 can dynamically and automatically update groups and index 230 for newly discovered buildings if common standard or custom attributes 74, 75 are found.

User interface 160 can also relay information regarding a space occupancy status. An occupancy indicator 354, a schedule indicator 355, and a next event indicator 356 are provided on page 350. This information can be helpful for maintenance, scheduling, and/or value alteration purposes. For example, a user may not want to edit certain setpoints while a space is occupied but rather wait until the space is unoccupied. Or, a user may desire to determine or update scheduling information related to occupancy.

Schedule indicator 355 also provides a user with at-a-glance control information, such as whether equipment is controlled by a main schedule or is under a special schedule. A main schedule is a primary set of operating characteristics for entities operating within BAS 10, such as buildings, spaces, equipment, devices, systems, and subsystems. In one embodiment, a main schedule controls basic operations and set points. Special schedules may be implemented to accommodate limited run or short term changes, such as for a holiday, to accommodate maintenance or a special event, or for some other reason. Special schedules are preferably used for short term or temporary chances overriding the main schedule to prevent special schedules from being left active unintentionally. Special schedules also provide a way to schedule temporary events or occurrences without having to alter the main schedule. Next event indicator 356 provides a brief schedule preview of the next event scheduled for the equipment. Providing group member, occupancy, control, and event information proximately and on page 350 enables a user to quickly determine current and impending status information for equipment without having to access multiple pages or navigate to find desired information.

Figure 9B:
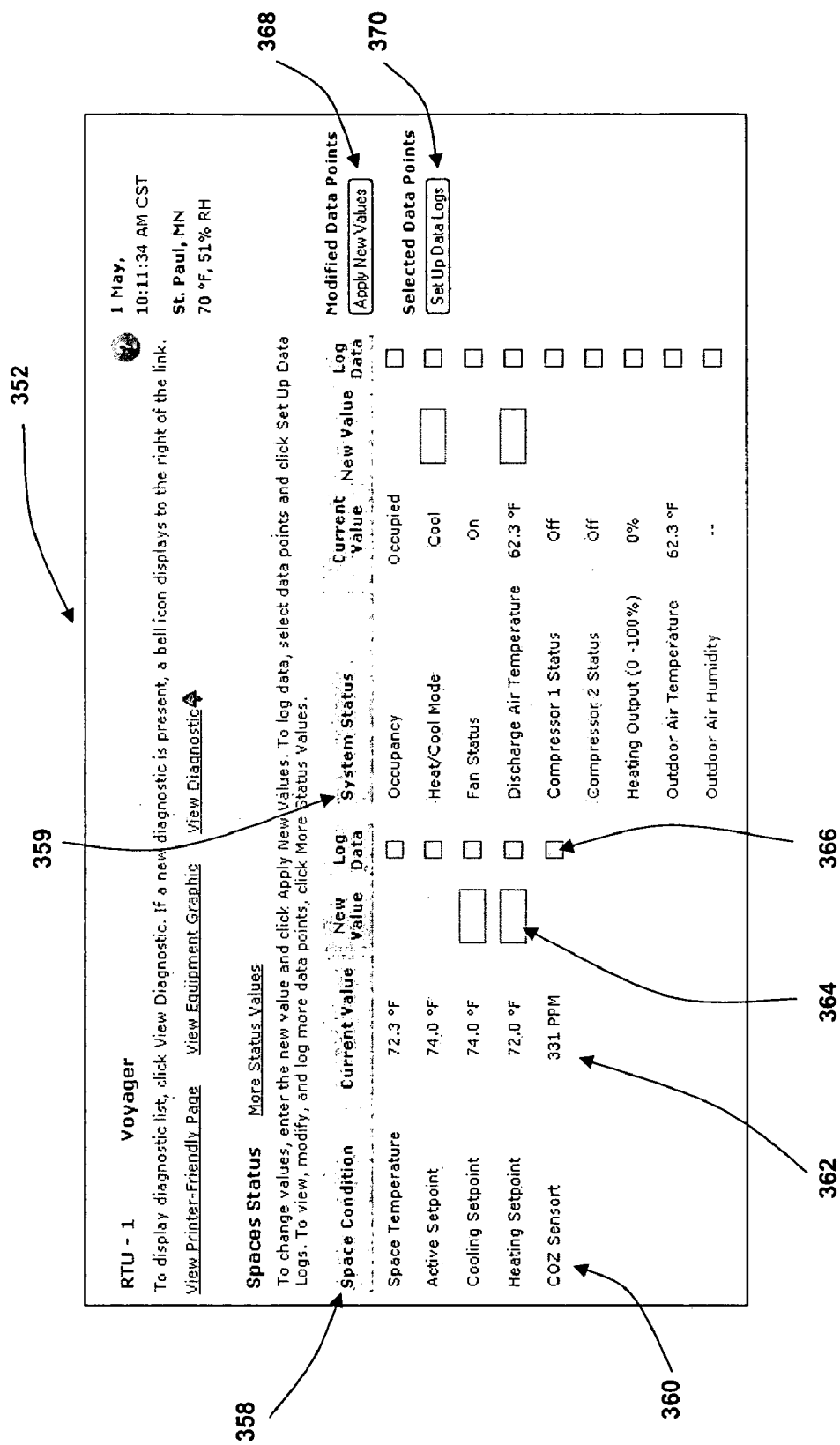
FIG. 9B is a detail view of the user interface page of FIG. 9A according to one embodiment of the invention.

Referring to FIGS. 9A and 9B, spaces table 352 includes a space condition portion 358 and a system status portion 359. Spaces table 352 thus includes information likely to be status critical and of greatest interest to a user first accessing user interface 160 to spaces page 350. Spaces table 352 presents space condition portion 358 and system status portion 359 proximate each other, enabling a user to quickly assess a space status, access additional information, and edit set points, if desired.

Space condition portion 358 includes available space conditions 360, current sensed conditions 362, new value fields 364, and data log selectors 366 in one embodiment. System status portion 359 includes similar information. Current sensed conditions 362 can include temperature, humidity, and other real-time sensed values. In one embodiment, spaces table 352 includes a real-time sensed temperature value and displays a current active setpoint. A user can alter a desired heating or cooling temperature setpoint easily and conveniently within user interface 160 by entering the desired value in a corresponding new value field 364 and instructing BAS 10 to apply the new values by selecting button 368. BAS 10 can incorporate the update immediately without system interruption or recompilation.

Figure 10:
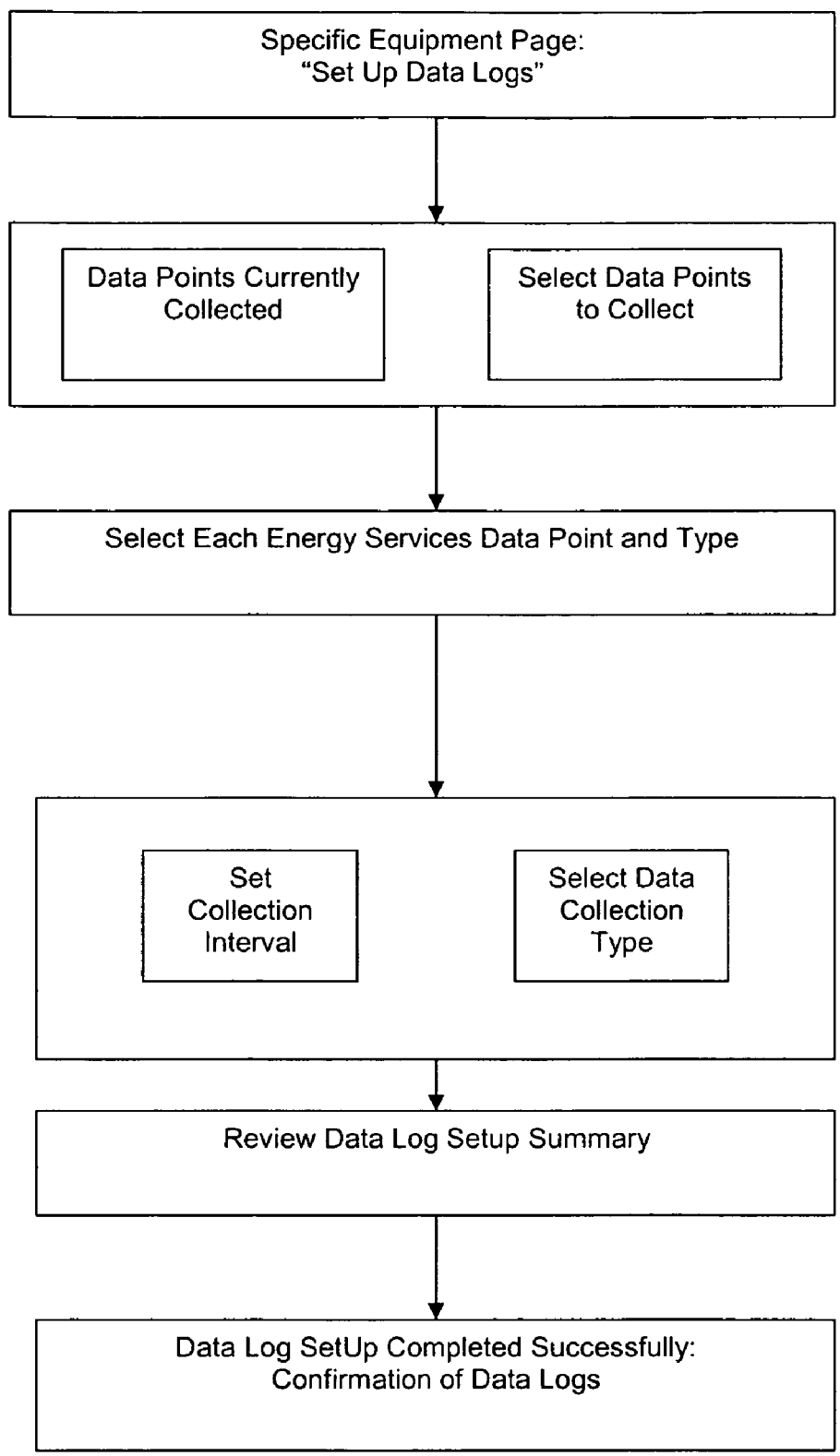
FIG. 10 is a data log block diagram according to one embodiment of the invention.

Regarding data log selectors 366, the manner in which data is collected can be use customized using a "set up data logs" sequence. By checking a log data box 316 corresponding to specific equipment and activating a set up data logs button 326, the user can set data collection intervals and adjust the time period for the collections. Instead of a date range as the time period for collections, the user may alternatively select a fixed number of samples for collection. An example data log sequence is depicted in FIG. 10.

Figure 11A:
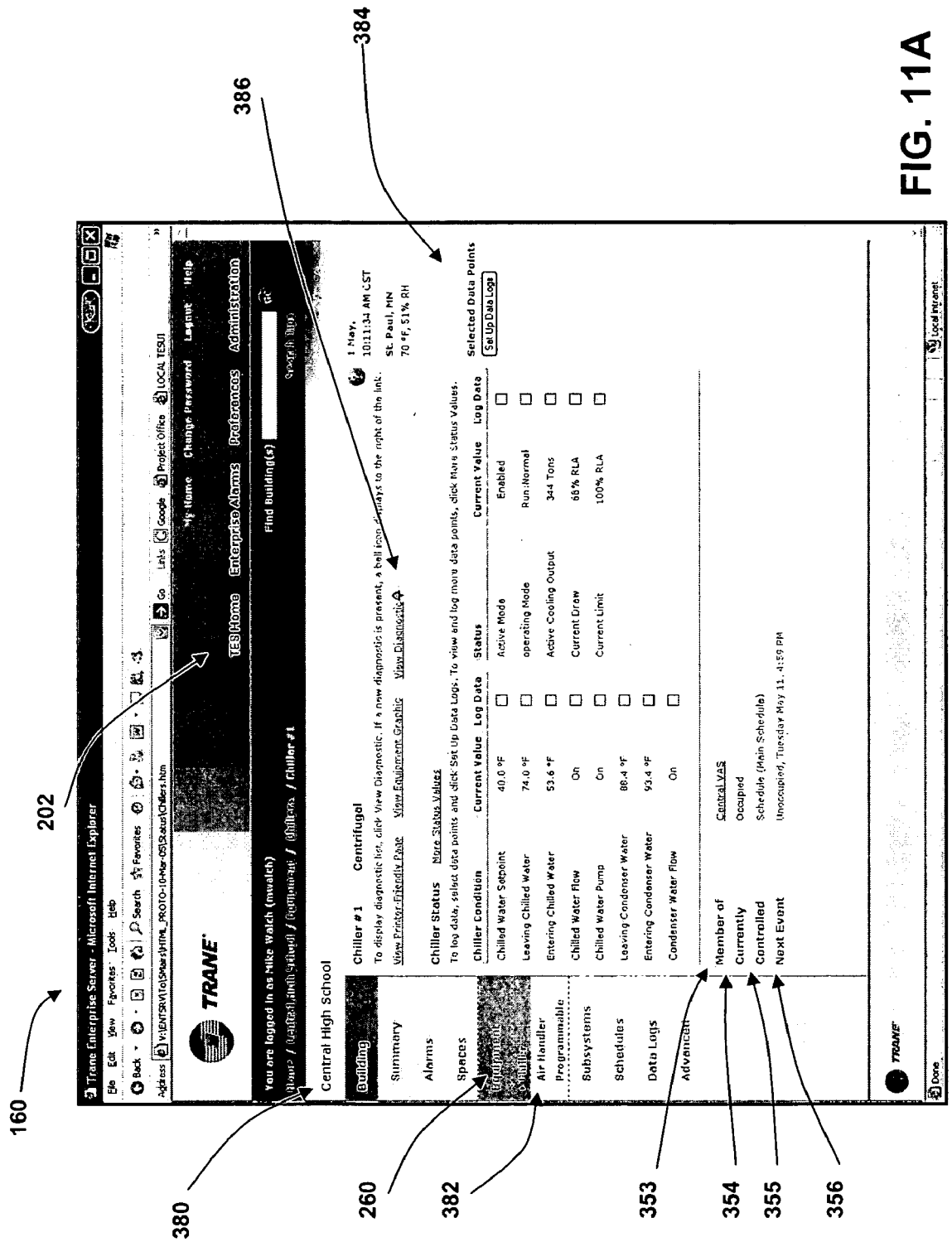
FIG. 11A is a user interface page according to one embodiment of the invention.

An equipment summary page 380 is depicted in FIG. 11A. Pages of user interface 160 relevant to specific equipment, similar to building summary page 250 and space summary page 350 described above, are accessible when the user selects equipment tab 260 or otherwise navigates within user interface 160. Similar to as described above with respect to selecting a space from space summary portion 330 of building summary page 250 to navigate to space summary page 350, selecting an alarm source (320) from alarm summary portion 310 of FIGS. 7A and 7B also directs a user to an equipment summary page 380. It will be appreciated by those skilled in the art that there typically are several ways to navigate to any given page in user interface 160; certain navigation paths are described herein in order to define an overall organization, layout, and flow of one embodiment of user interface 160.

On page 380, various categories of available equipment appear as subheadings 382 below tab 260, such as "Chiller," "Air Handler," and "Programmable Controller." Selecting a desired subheading 382 directs the user to a list of the specific units within each category from which a particular equipment unit can be selected to display an equipment status page.

Figure 11C:
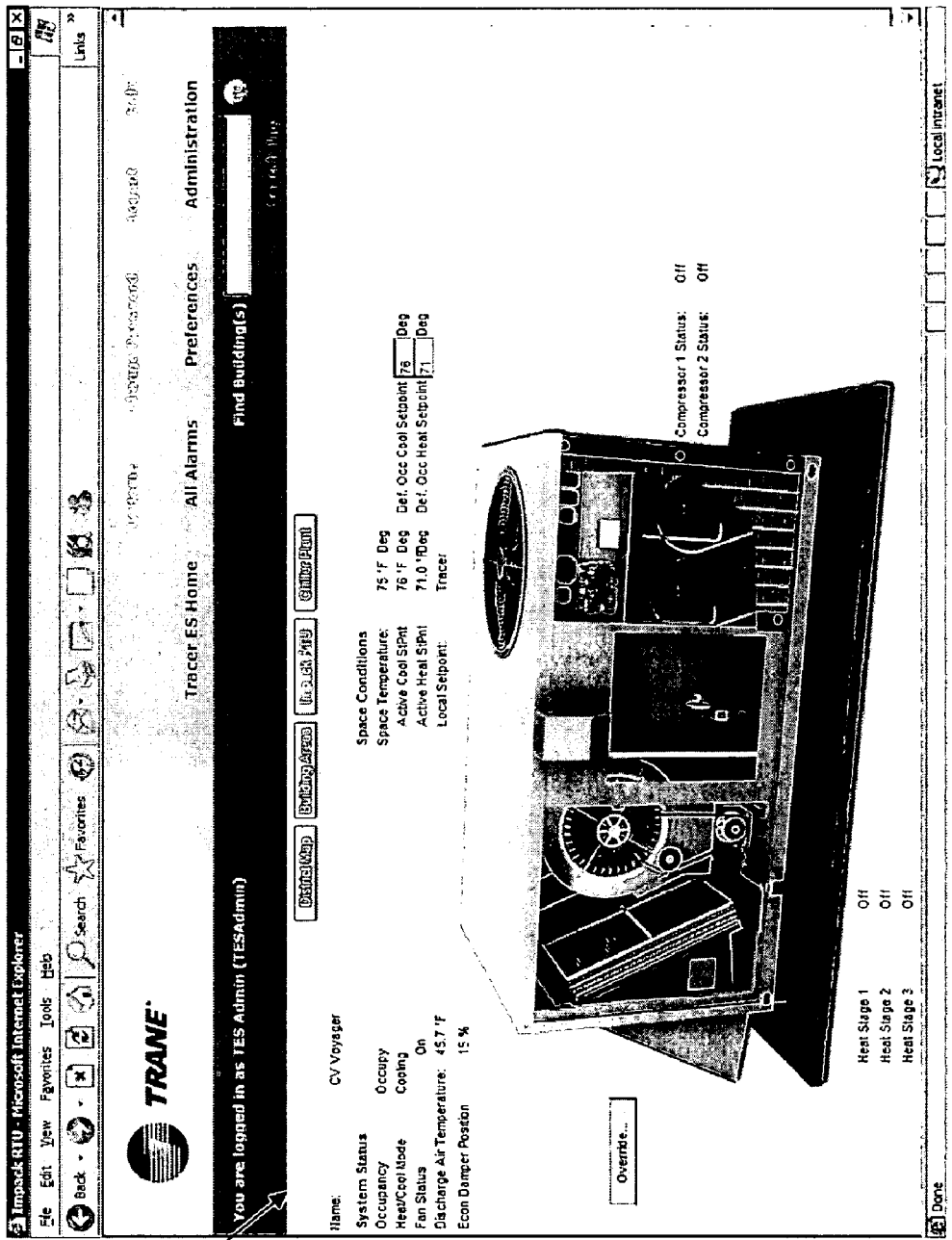
FIG. 11C is a user interface page according to one embodiment of the invention.

As previously described above with reference to FIGS. 9A and 9B, current status values and setpoints are displayed on page 380 in equipment status summary portion 384, as well group data 353, 354 and links 386 to additional information regarding the subject equipment. For example, equipment status page 340 relates to a chiller. Referring to FIGS. 11A and 11B, chiller status summary portion 384 is divided into a chiller condition portion 388 and a status portion 390 and lists static and real-time dynamic information about the specific chiller, such as current values 392 for various aspects of the chiller's status and performance. An equipment graphic page 381, reachable via an equipment graphic link 386, is depicted in FIG. 11C. Equipment graphic page 381 also includes static and dynamic graphics and text related to particular equipment and systems and spaces associated with the equipment.

Figure 12:
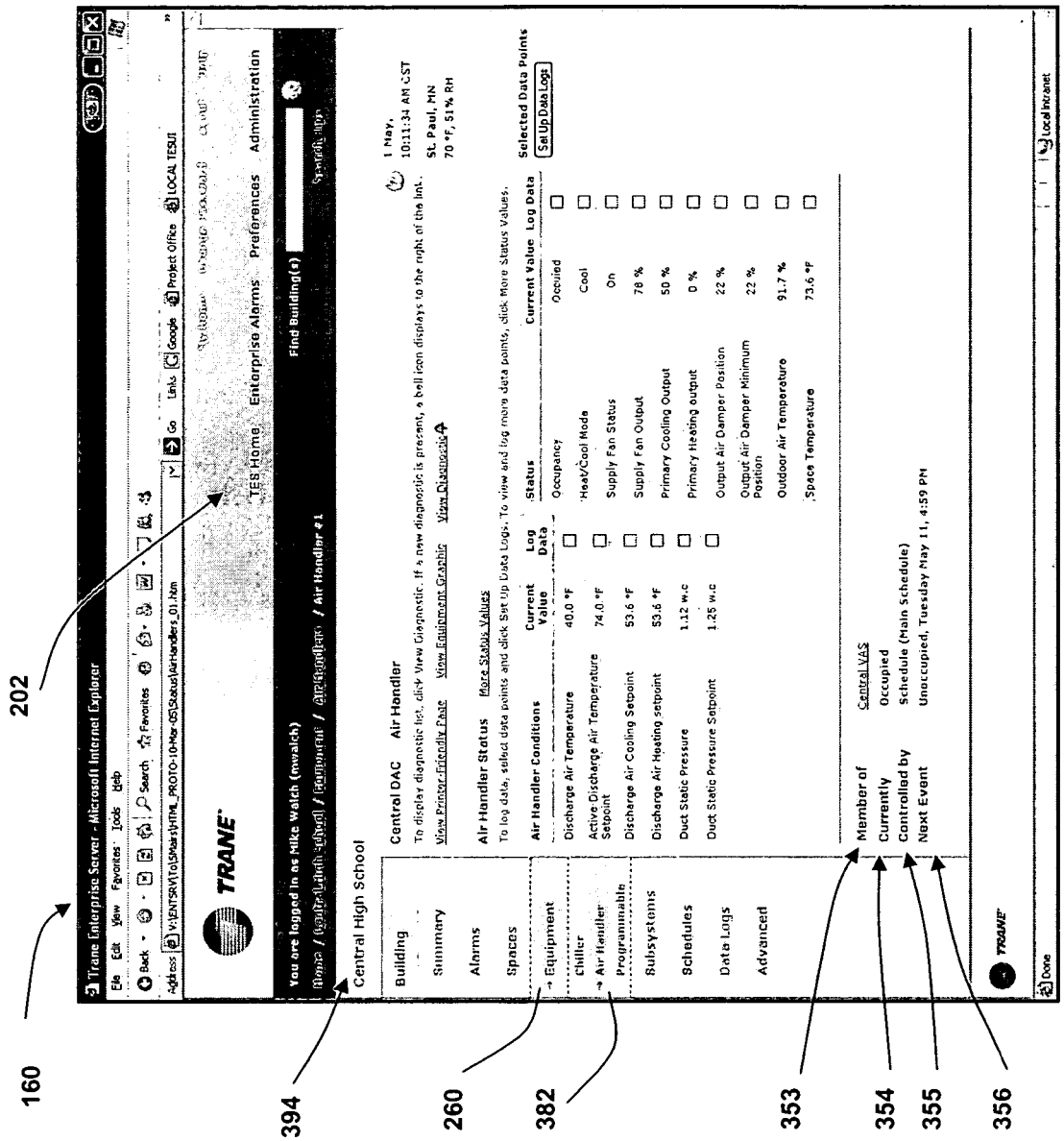
FIG. 12 is a user interface page according to one embodiment of the invention.

Pages and links similar to those described above are also provided for other categories of equipment in BAS 10. In FIG. 11A, chiller status page 380 was depicted, but other status pages for other equipment, such as air handlers, are also included in user interface 160. An example air handler status page 394 of user interface 160 is depicted in FIG. 12. Similar customized status pages within user interface 160 may also be used for any other equipment controlled or managed by BAS 10. For example, certain new values can be substituted by the user, including setpoints, heat/cool mode, and discharge air temperature, as previously described, for programmable equipment controlled by BAS 10. BAS 10 can accept new values on-the-fly, without requiring code recompilation, system restart, or some other disruption or suspension of normal activity of BAS 10.

Figure 13A:
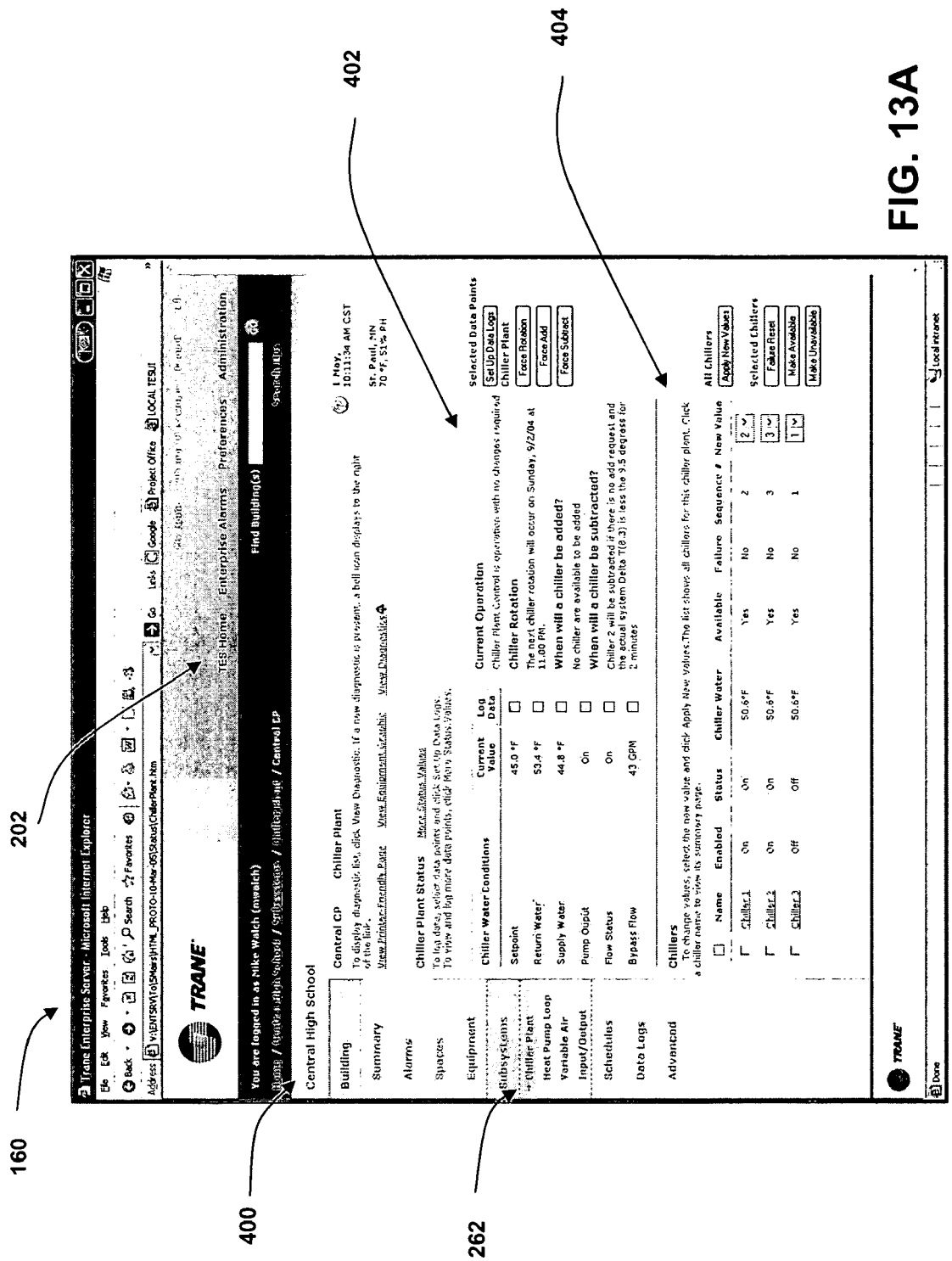
FIG. 13A is a user interface page according to one embodiment of the invention.
Figure 13B:
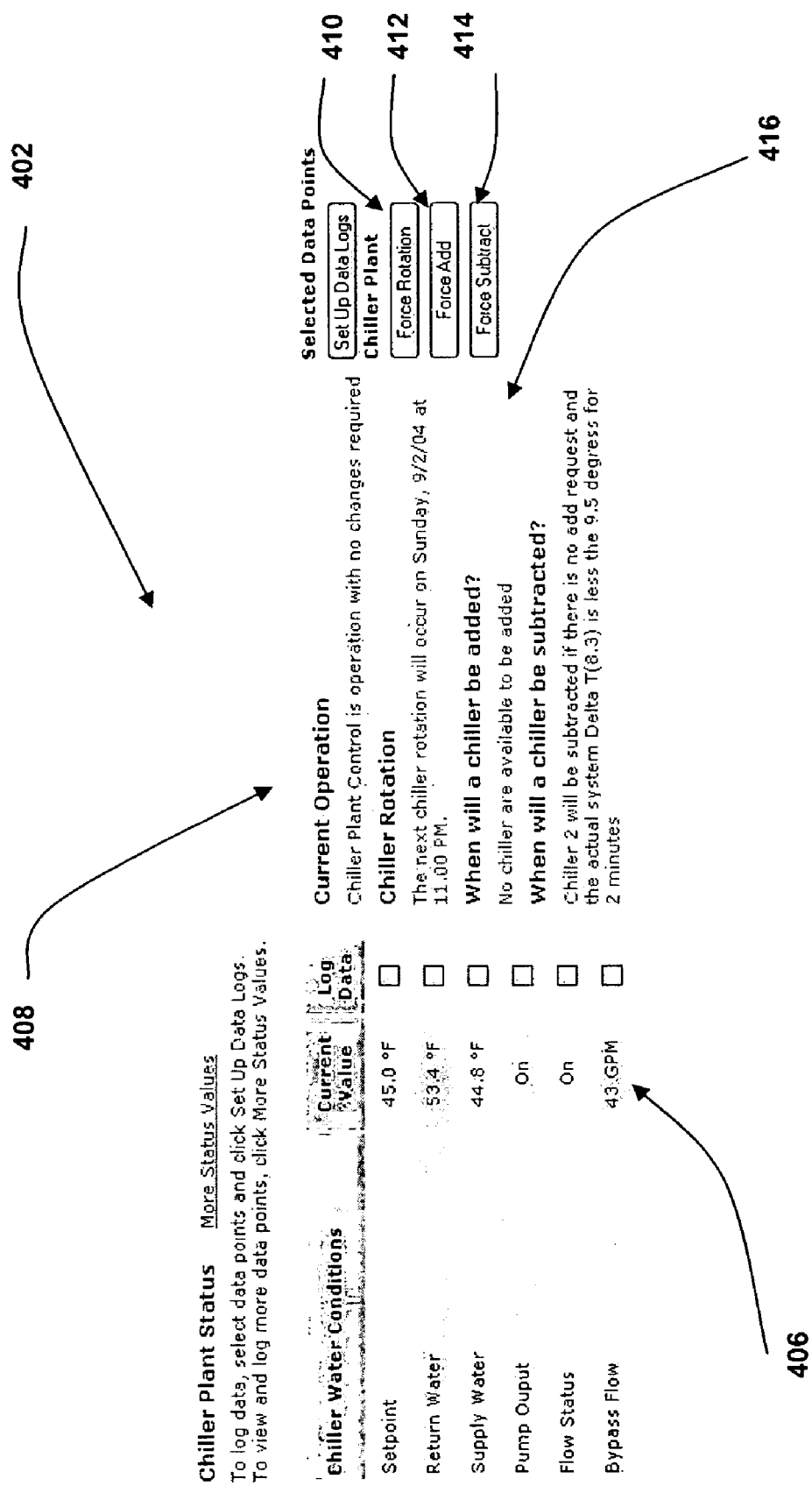
FIG. 13B is a detail view of the user interface page of FIG. 13A according to one embodiment of the invention.
Figure 13C:
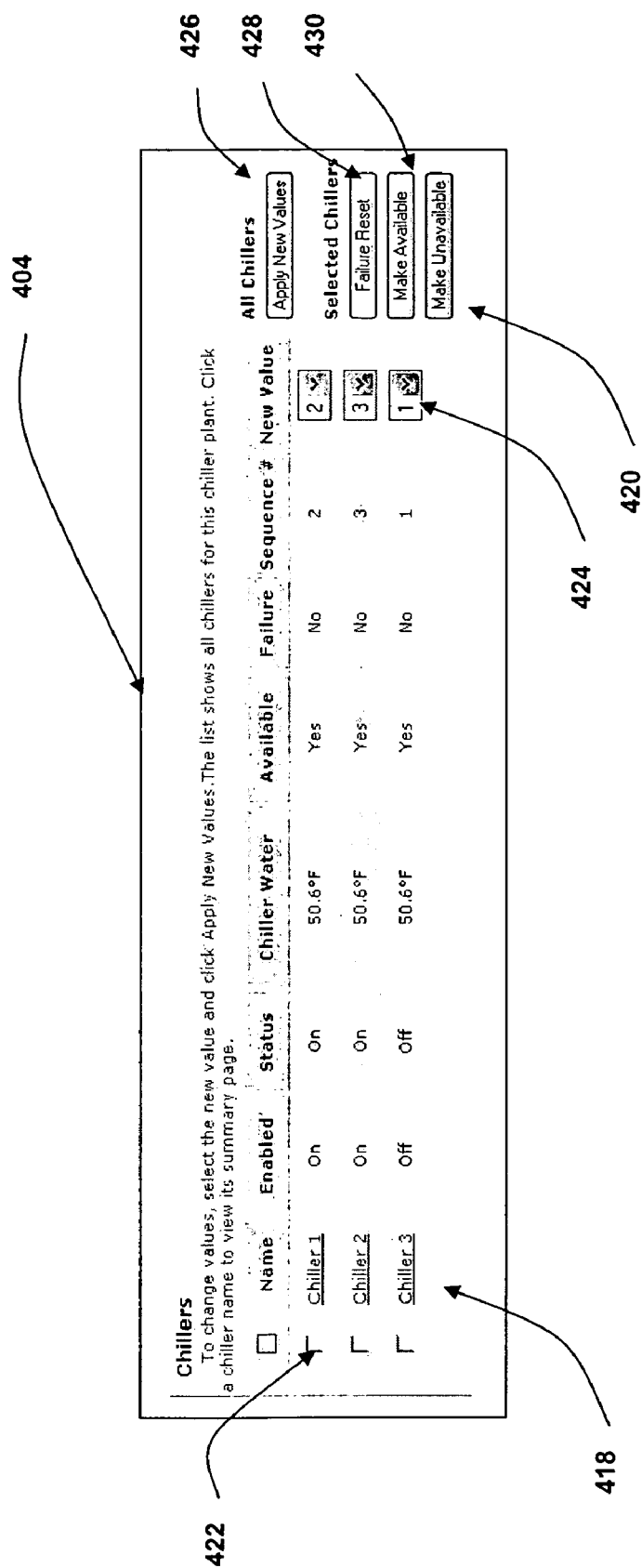
FIG. 13C is another detail view of the user interface page of FIG. 13A according to one embodiment of the invention.

Referring briefly to FIG. 7A, subsystems tab 262 provides links to portions and pages of user interface 160 that display information related to equipment systems and subsystems of BAS 10. For example, FIGS. 13A-C depict an example subsystem summary page 400 of user interface 160 related to a chiller plant. Although page 400 relates specifically to a chiller plant, the equipment choice of this example is arbitrary and the general features of page 400 are generally relevant within user interface 160 and BAS 10 to virtually any equipment system or subsystem. Different values and information will be relevant to different equipment systems; accordingly, some variation from the particular examples depicted in and described with reference to FIGS. 13A-C will exist on other equipment system pages. As previously described with respect to other pages of user interface 160, page 400 includes status tables related to equipment subsystems, including subsystem status portion 402. Subsystem summary page 400 also includes an equipment status portion 404.

Custom screens and pages such as page 400 of are presented in user interface 160 to simplify the information presented regarding complex systems and subsystems. Raw data and information not edited and tailored for presentation via user-intuitive page 400 could be overwhelming and therefore not useful to the average user. From page 400, however, a user may view status critical information and access more detailed data and information about sophisticated systems and subsystems as needed.

Subsystem status portion 402 as depicted in FIGS. 13A and 13B includes information about a chiller plant, which is one or more chiller units operating as a group. The information includes current static and dynamic values 406 relating to chiller plant conditions and current operational information 408. A static value 406 is, for example, a current setpoint, while a dynamic value 406 in table 362 is a return or supply water temperature. Operational information 408 provides scheduling and maintenance information and user control features. For the chiller plant of page 400, chiller rotation 410, addition 412, and subtraction 414 can be scheduled, with current schedules 416 displayed on page 400. In general, schedules define relationships between objects in BAS 10, time, and/or other objects in BAS 10. A user can define or alter schedules related to an object in one embodiment of the invention. A user can also manually implement or force rotation, addition, or subtraction as needed or desired through page 400 and through other pages of user interface 160. Basic operational status information is also provided.

Page 400 further displays equipment status portion 404, which includes equipment identifier links 418 for each chiller as depicted in FIGS. 13A and 13C. Identifier links 418 can be user customized names or default system values obtained during a discovery or integration process. In the example of page 400, three chillers of BAS 10 are identified as Chiller 1, Chiller 2, and Chiller 3. The equipment identifiers are hyperlinked (418) to other portions and pages of user interface 160. For the chillers listed in equipment status portion 404 of page 400, equipment identifier links 418 direct a user back to an equipment page 380 (refer to FIG. 13A) for the individual chillers. A user may also manually control values and settings for selected chillers through status portion 404, for example by selecting a button or link 420, marking a selector field 422, making a selection from a drop-down menu 424, or by other information editing or entry means. For the chiller plant of page 400, a user can apply new values 426, initiate a failure reset 428, or make a particular chiller within the chiller plant available or unavailable 430.

Figure 14:
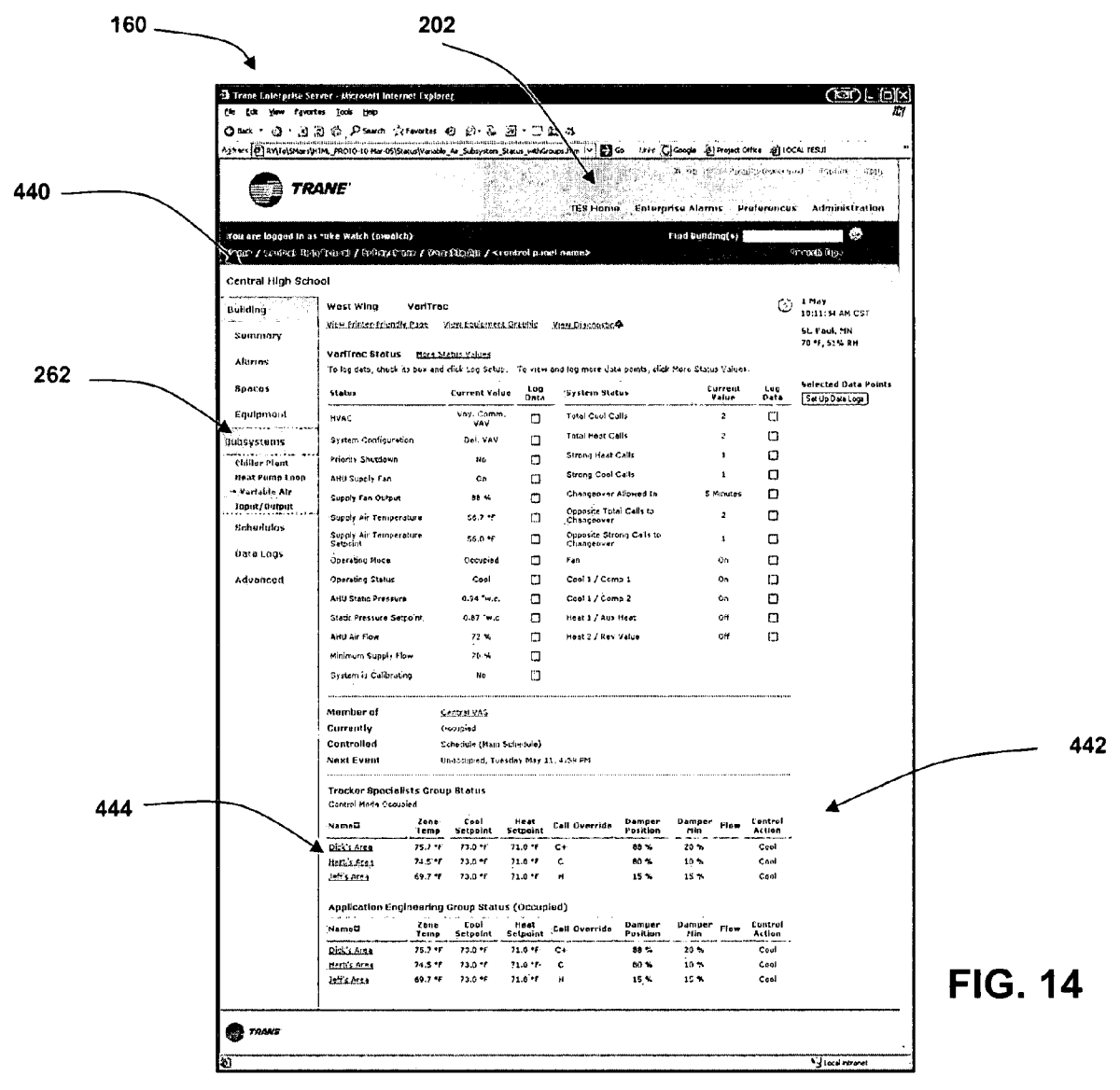

Similar sets of pages are provided for other equipment subsystems of BAS 10, such as a heat pump loop and variable air subsystems. The pages for these equipment subsystems may also be configured to display information specific to a particular subsystem. For example, as shown in FIG. 14, a variable air page 440 includes tabular information 442 identified and sorted according to user customized information 444. In this case, the information is sorted by a person's name. The person may be a maintenance or managerial person responsible in some way for a space, or the person can be associated with the space in another manner, such as by physical office or workspace assignment. A user can therefore customize page 440 and other pages with associations, identifiers, and references that are familiar, making BAS 10 more easily understood and manageable via user interface 160.

The descriptions and depictions of the above-described specific pages set forth by example the general functionality and operation of BAS 10, in particular user interface 160, and are a context within which the following description of use of user interface 160 can be understood according to one embodiment. As previously mentioned, a variety of user customization and control features are provided by user interface 160. Through links on pages displaying space and equipment information, the user can change setpoints, control data logging, and create custom pages.

Figure 15:
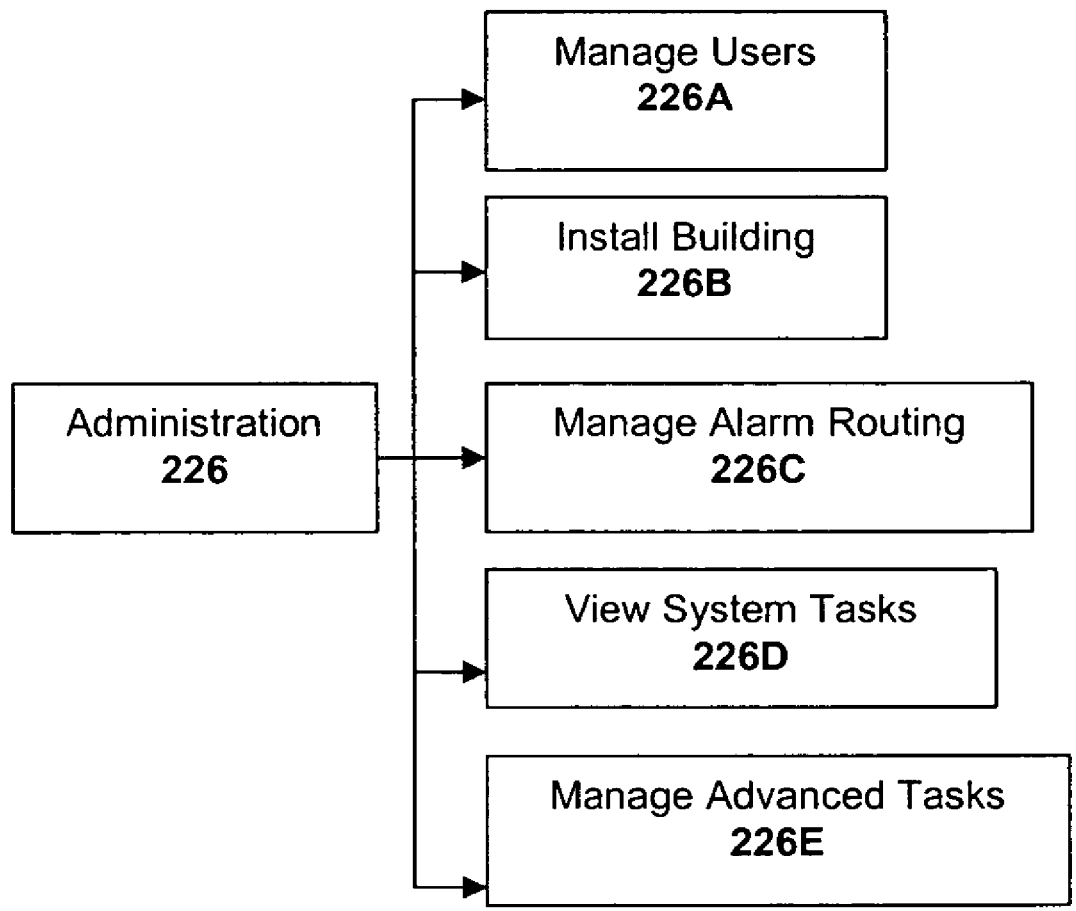
FIG. 15 is a user interface navigation diagram according to one embodiment of the invention.

Administration link 210 directs the user to an administration portion 226 of user interface 160 comprising a series of pages that are organized as shown in FIG. 15 in one embodiment. Administration portion 226 of user interface 160 provides administrative customization and control of BAS 10, which generally relates to the addition or removal of the data shown on the various equipment pages, the ability to manage users of the system, install new buildings, manage alarm routing, and view system tasks, as previously described.

In one embodiment, BAS 10 provides user access at more than one level. High-level users can manage the level of access granted to other users in administration portion 226 through managing users portion 226A. Other user management options may also be available. Level access can be controlled via a user login, password, and/or other user identification processes. A user is generally a person whose duties typically relate to monitoring or controlling BAS 10 without having to engage in programming or the recompilation of software code. A high-level, or administrative, user is typically a user who generally has a higher level of access to system controls and customization functions. For example, an administrative user may be provided with a login code that authorizes access to pages that a general user could not access. Despite this greater access, however, an administrative user, like a general user, will not normally be expected to engage in reprogramming or recompiling to customize user interface 160 or BAS 10. Administration portion 226 of user interface 160 can be wholly or partially available to users based upon their level of administrative access. Administration portion 226 of user interface 160 also includes utilities for installing buildings 226B, managing alarm routing 226C, viewing system tasks 226D, and performing advanced tasks 226E, such as configuration of system parameters, creating and managing custom attributes, creating schedules, and customizing pages viewable in user interface 160.

Figure 16:
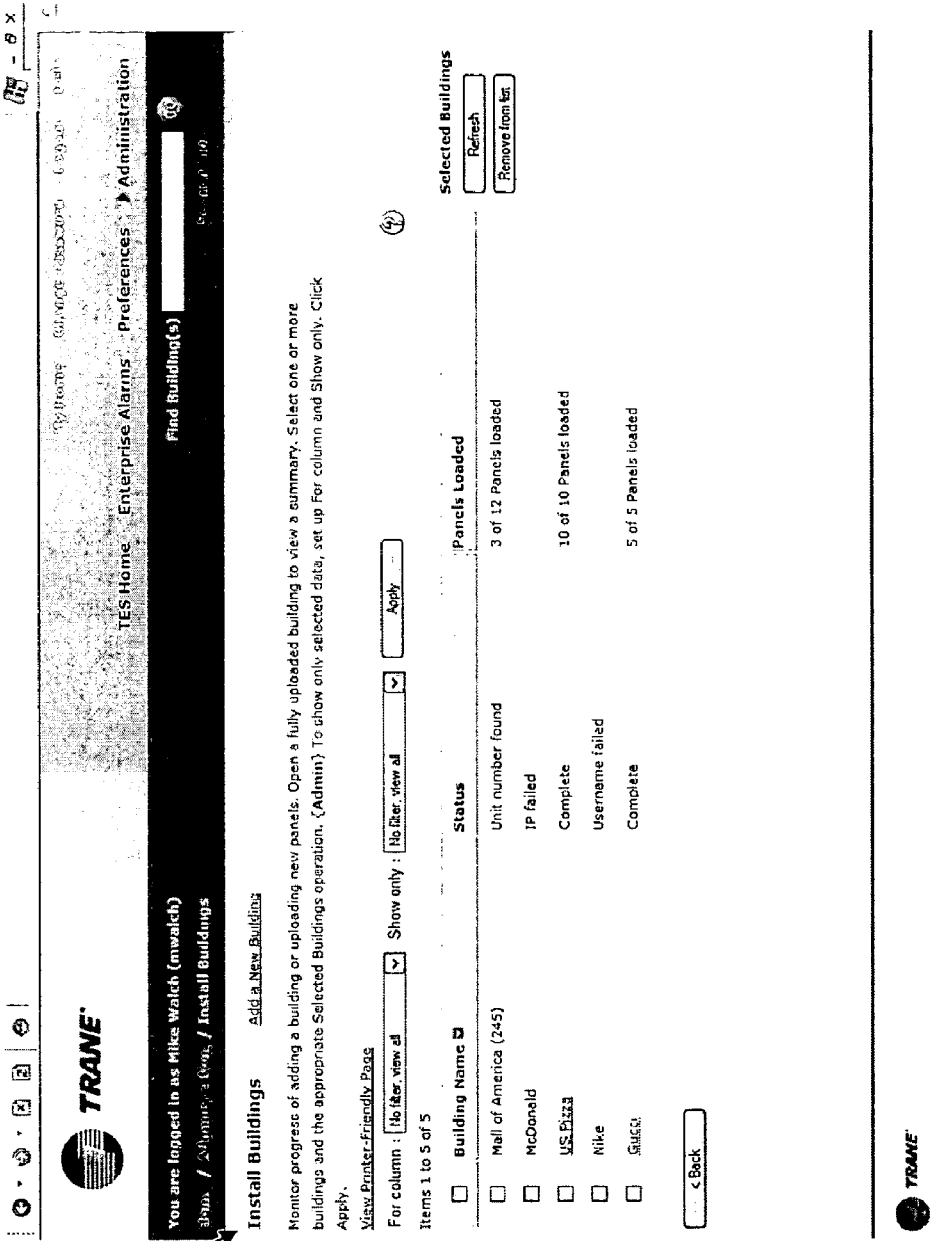
FIG. 16 is a user interface page according to one embodiment of the invention.
Figure 17:
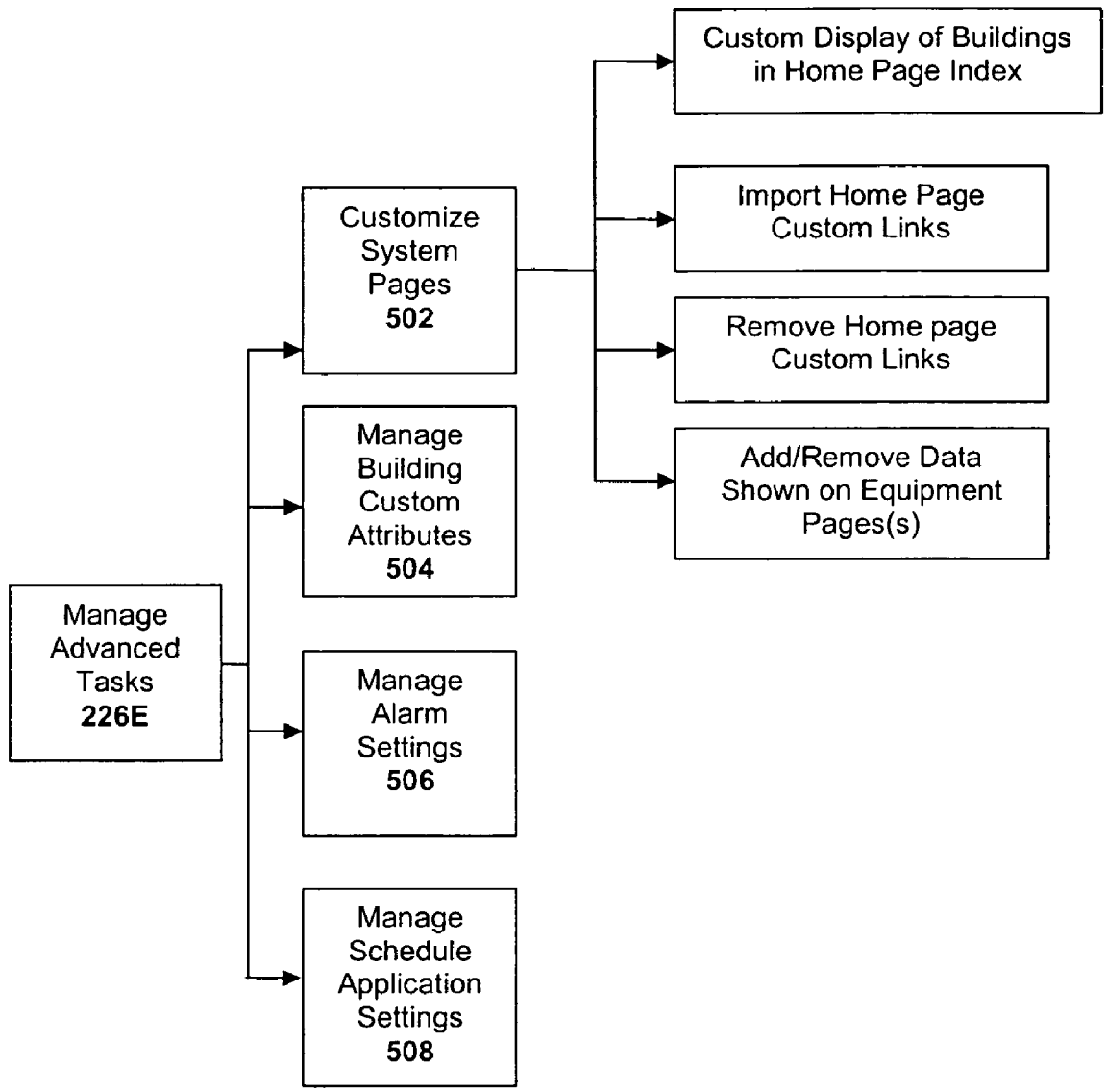
FIG. 17 is a user interface navigation diagram according to one embodiment of the invention.

An example building installation page 518 is depicted in FIG. 16. The dynamic extensibility of BAS 10 provides for the periodic discovery, addition, or uploading of new buildings or panels. Page 518 includes a progress and status portion 519 for each of the buildings undergoing the installation process, which includes information regarding the status of the communications between ESE 20 and the new building (or panel) and the number of panels loaded out of the total number of panels.

A user can also view and manage system tasks 226D. Advanced tasks 226E are shown in more detail in FIG. 17. Advanced tasks 226E include the customization of system pages 502, the management of custom attributes of buildings 504, the management of alarm settings 506, and the management of schedule application settings 508.

Figure 18:
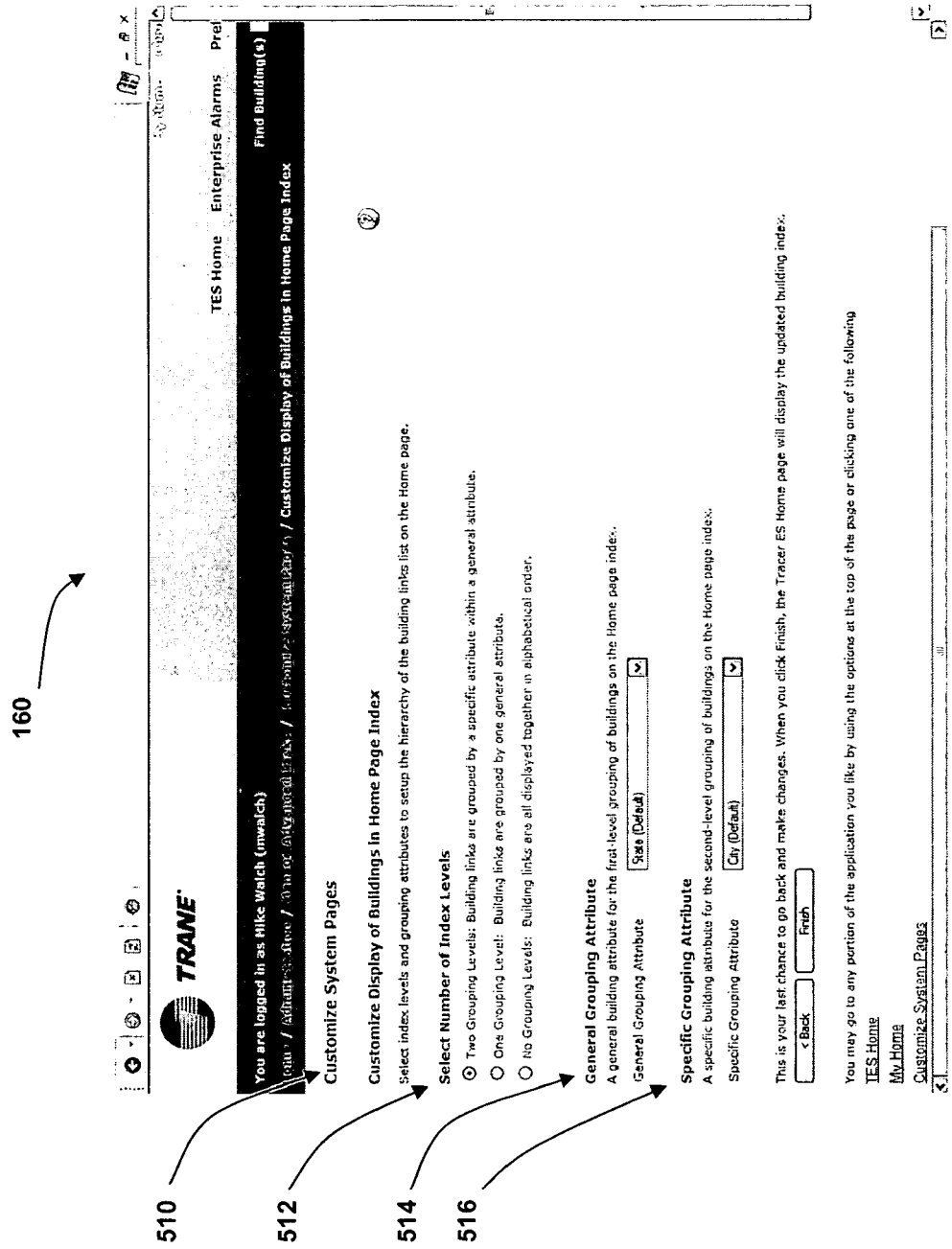
FIG. 18 is a user interface page according to one embodiment of the invention.

Customization of system pages 502 includes both content and layout control options. Referring to FIG. 18, a system customization page 510 includes user selectable options for customizing the display of buildings in the index on home page 200. Customization can be carried out by a user by selecting the desired number of index levels 512 and assigning a corresponding number of general and special grouping attributes 514, 516. With one index level, the buildings are grouped according to one general attribute. When two index levels are used, the buildings are grouped by a special attribute within a general attribute. The grouping attributes 514, 516 are relevant to the display and arrangement of buildings in building index 230 (see FIG. 5A) and are included as group link 353 (see FIG. 9A), for example. The number of index levels determines how the special and general attributes affect the arrangement and appearance of index 230. With no index levels, all buildings are displayed together in alphabetical order in index 230 according to a default setting of BAS 10 and user interface 160 in one embodiment.

Figure 19:
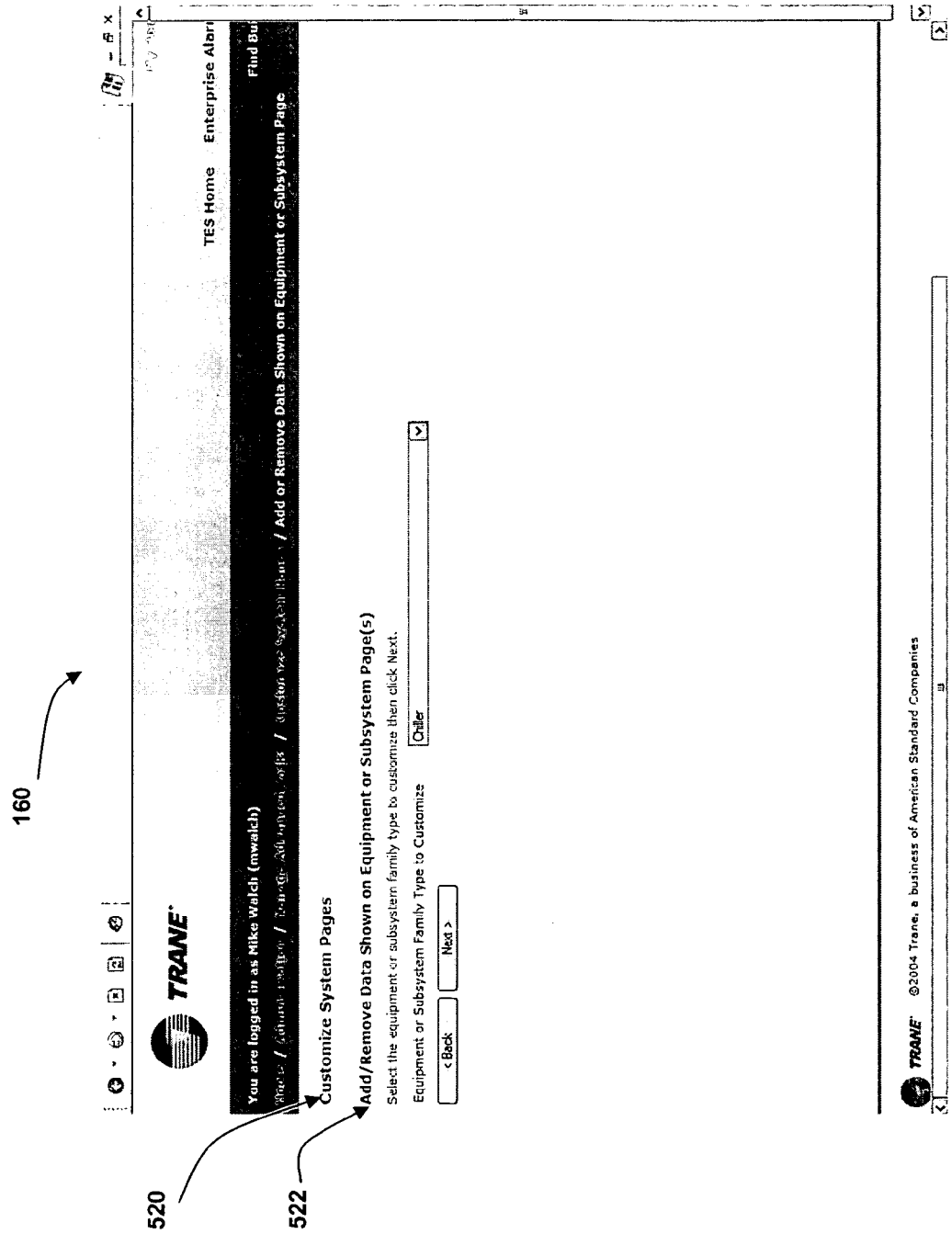
FIG. 19 is a user interface page according to one embodiment of the invention.
Figure 21:
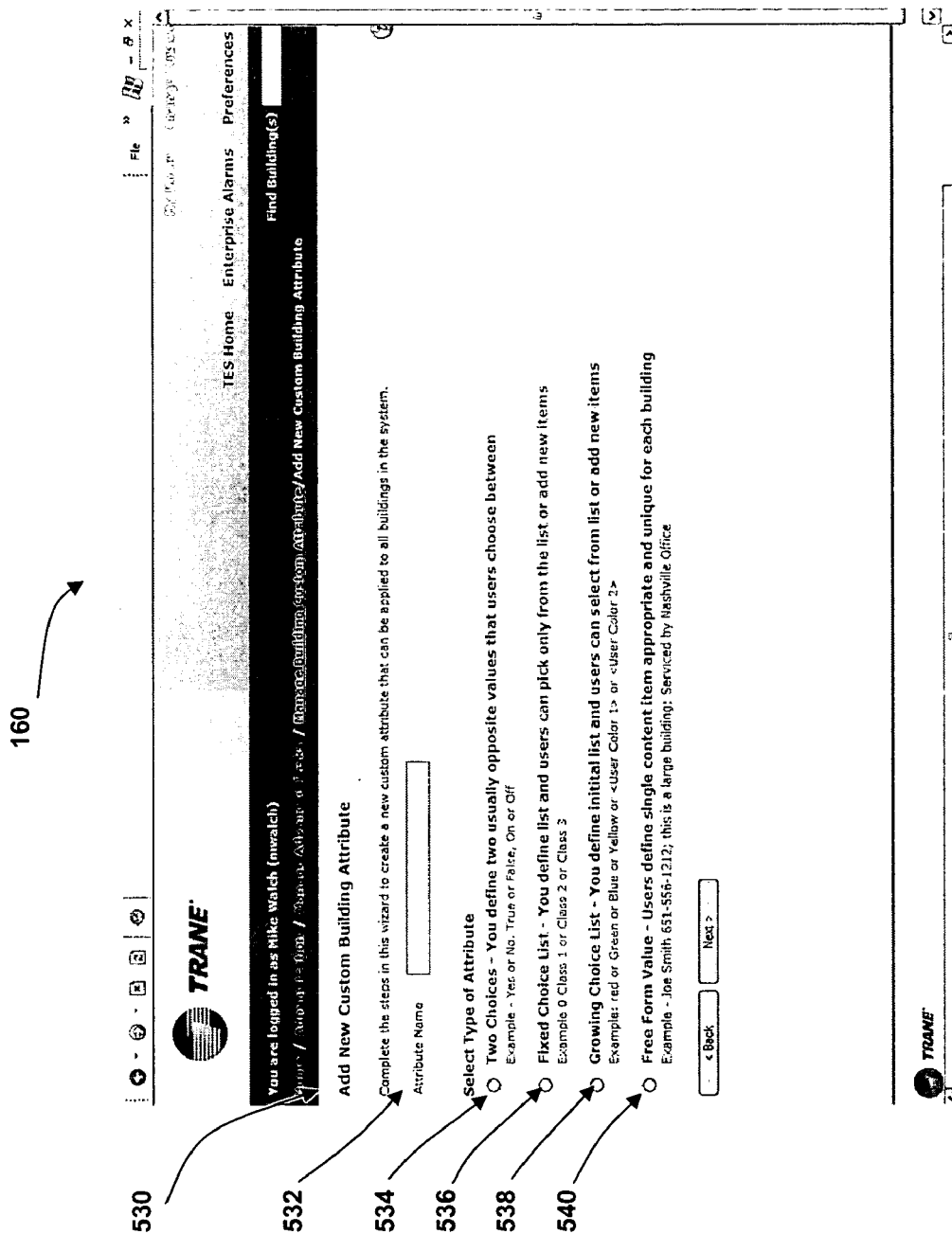
FIG. 21 is a user interface page according to one embodiment of the invention.

Other page customizations relate to the links available on home page 200 and the addition or removal of data shown on equipment pages and equipment subsystem pages. Referring to FIG. 19, a customize system page 520 is depicted. Page 520 specifically relates to adding or removing data to be shown on equipment or subsystem pages (refer, for example, to FIGS. 11A, 12, and 13A described above), but the format is exemplary of and generally relevant to adding or removing data on home page 200 or on other pages of user interface 160. A user first selects the equipment or subsystem data to be customized at 522. Then, the user is directed to a table showing all currently displayed data points, as well as default display settings, for that equipment or subsystem, such as on page 524 in FIG. 20. The user may customize the display by selecting or deselecting data points in selection table 526 as desired.

A user may also add or remove links to home page 200 and to other pages of user interface 160 by importing and removing custom links. The custom links added may be to other pages of user interface 160, or internal links. The links added may also be external, such as to web or Intranet pages. A user may desire to link to a news or weather site publicly available on the Internet. A user may also link to non-public pages or information. For example, if BAS 10 relates to a college campus, a user may link to an internal campus event calendar or information page, such as a staff and faculty directory. The custom links can be added to pages of user interface 160 to integrate virtually any information a user deems helpful to management of BAS 10.

User interface 160 therefore provides ways in which the user can streamline interface 160 to include only those links relevant to the user's task. Further, BAS 10 allows each user of interface 160 to customize the pages and links according to their preferences and tasks in one embodiment. Therefore, users responsible for different tasks or having varying duties can create their own custom user interface 160. BAS 10 serves and loads the proper custom user interface 160 by saving and associating the customizations with a user identifier, such as by a logon routine. In another embodiment, only an administrative user can customize interface 160 in this manner, providing a single user interface 160 for standard level users.

A related customization function accessible via through advanced tasks 226E concerns custom attributes of buildings 504. Referring to FIG. 20, a custom building attributes management page 530 allows a user to create and manage the custom attributes both for buildings currently managed by BAS 10 and for buildings yet to be discovered. In one embodiment, four types of attributes 532 may be used. A first type of attribute 534 has two choices; two mutually exclusive values are defined that require a choice. A second type 536 is a fixed list, where a choice is made either from the list or entered manually. A third type 538 is an expandable list, which is an initial list that may be supplemented by the user. A fourth type 540 is a free form value, which is a unique value for a building that a user can create. When creating custom building attributes, the user may assign a new attribute as a default value for all newly discovered buildings and may also select the attribute for use in customizing the building index on home page 200.

Figure 22:
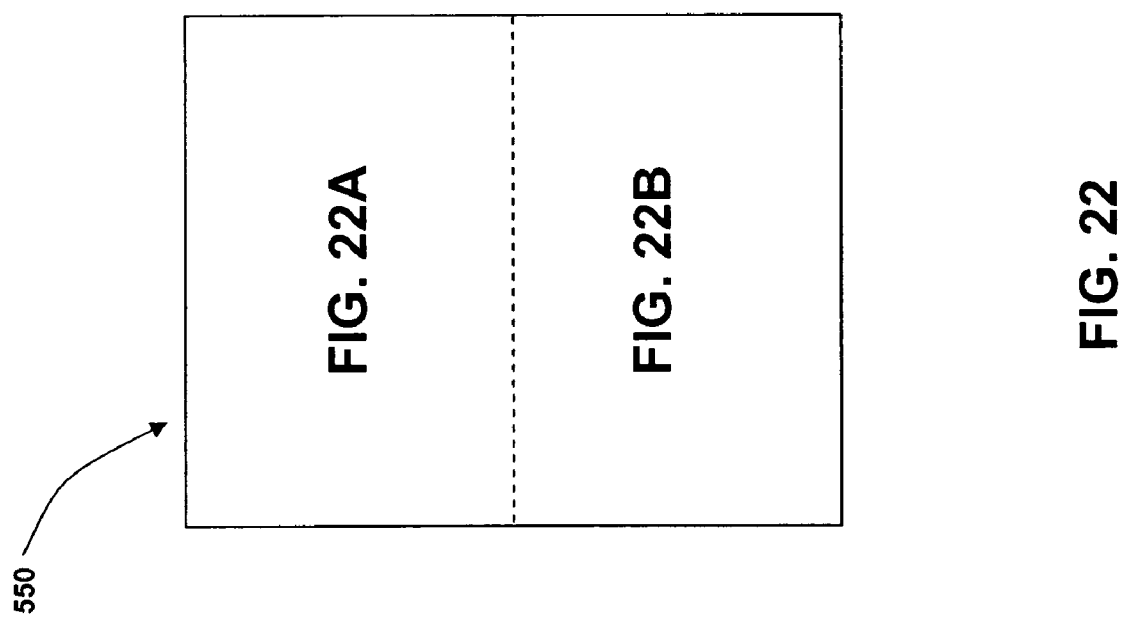
FIG. 22 is a user interface page according to one embodiment of the invention.
Figure 22A:
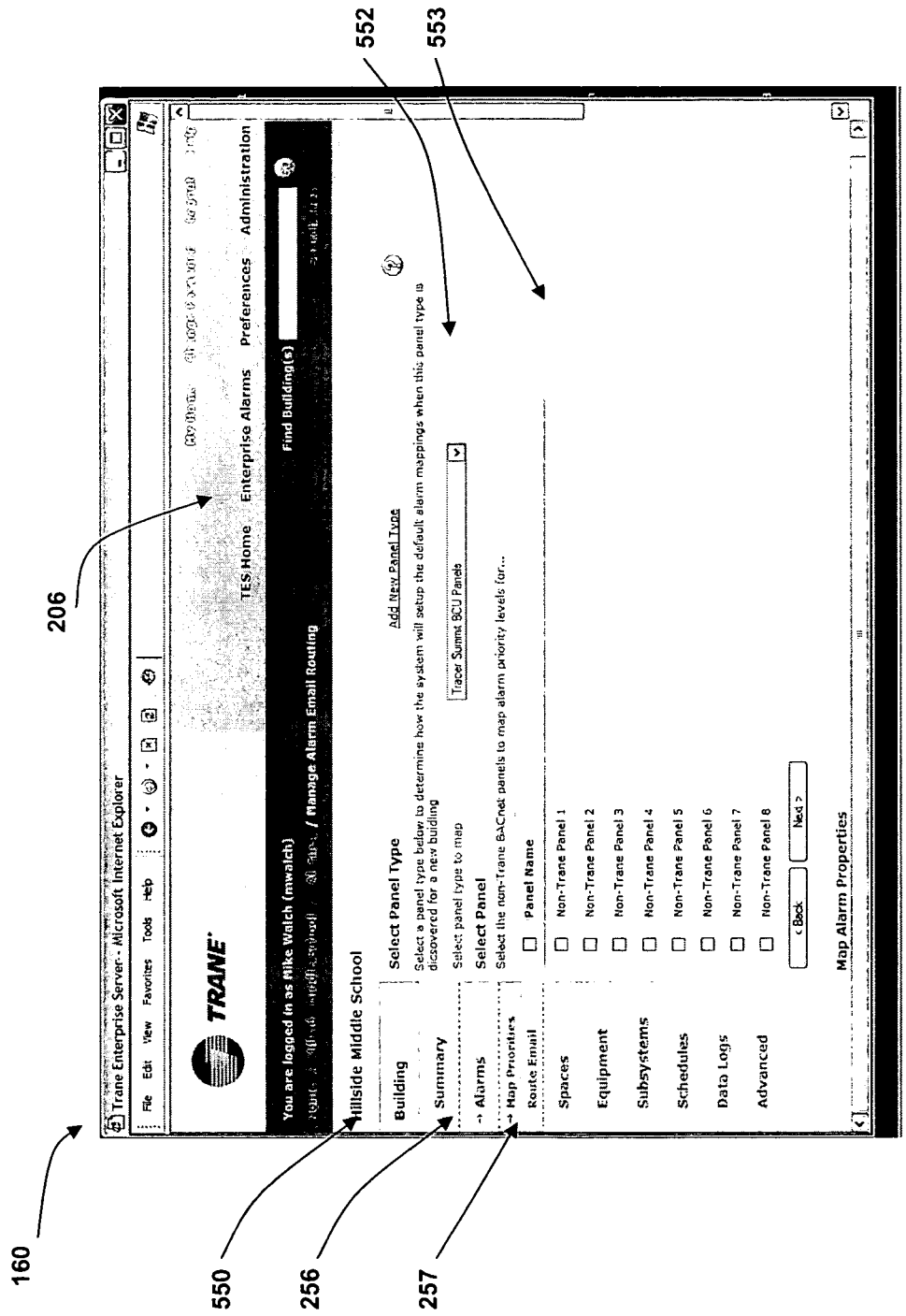
Figure 22B:
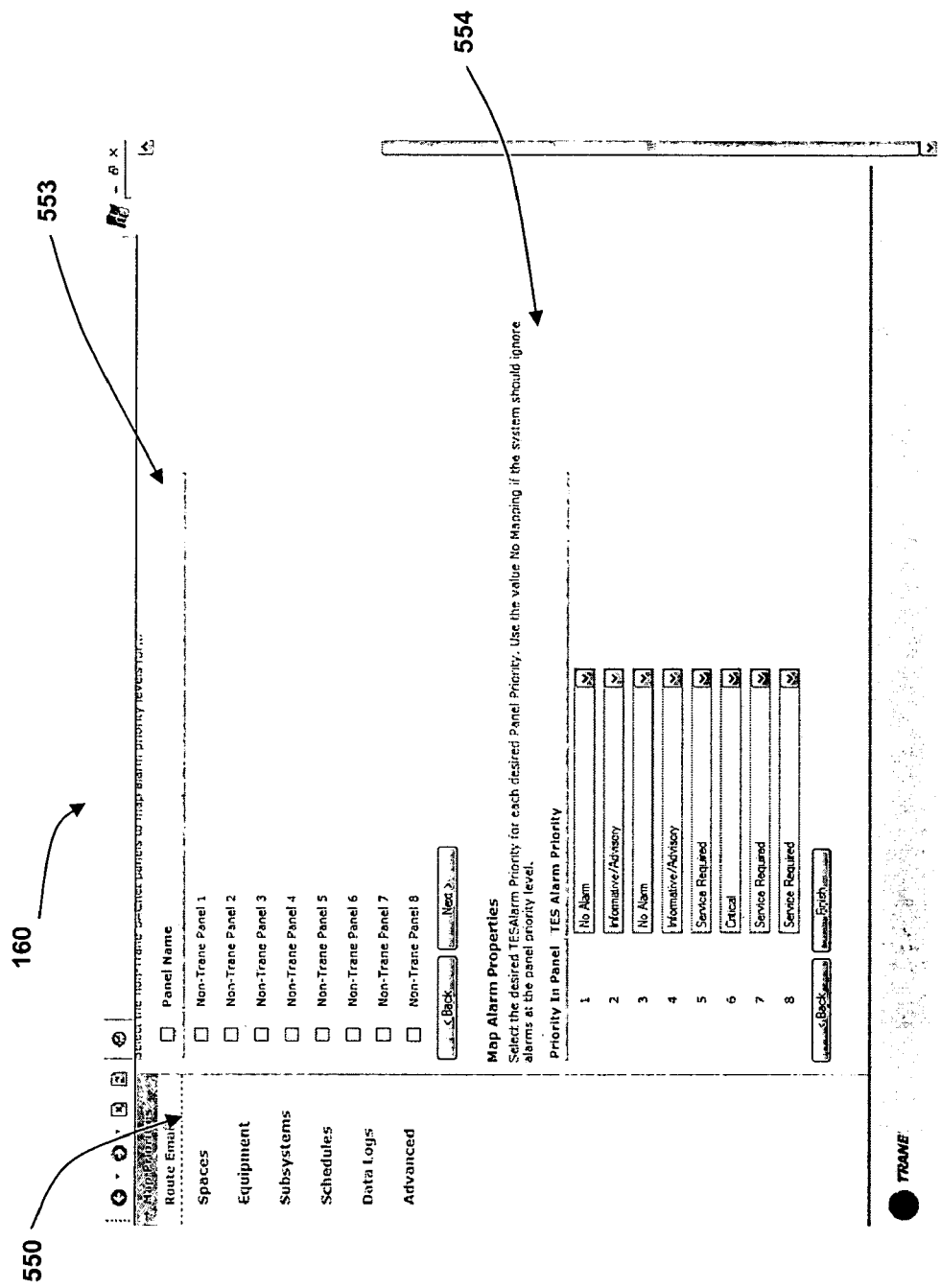

Referring to FIGS. 22A-C, an important aspect of BAS management and control is the efficient receipt and handling of system alarms 506. The management of and response to alarms in BAS 10 may be user customized according to one embodiment of the invention, generally available through alarm tab 206 (refer to FIG. 5A, for example).

Figure 23:
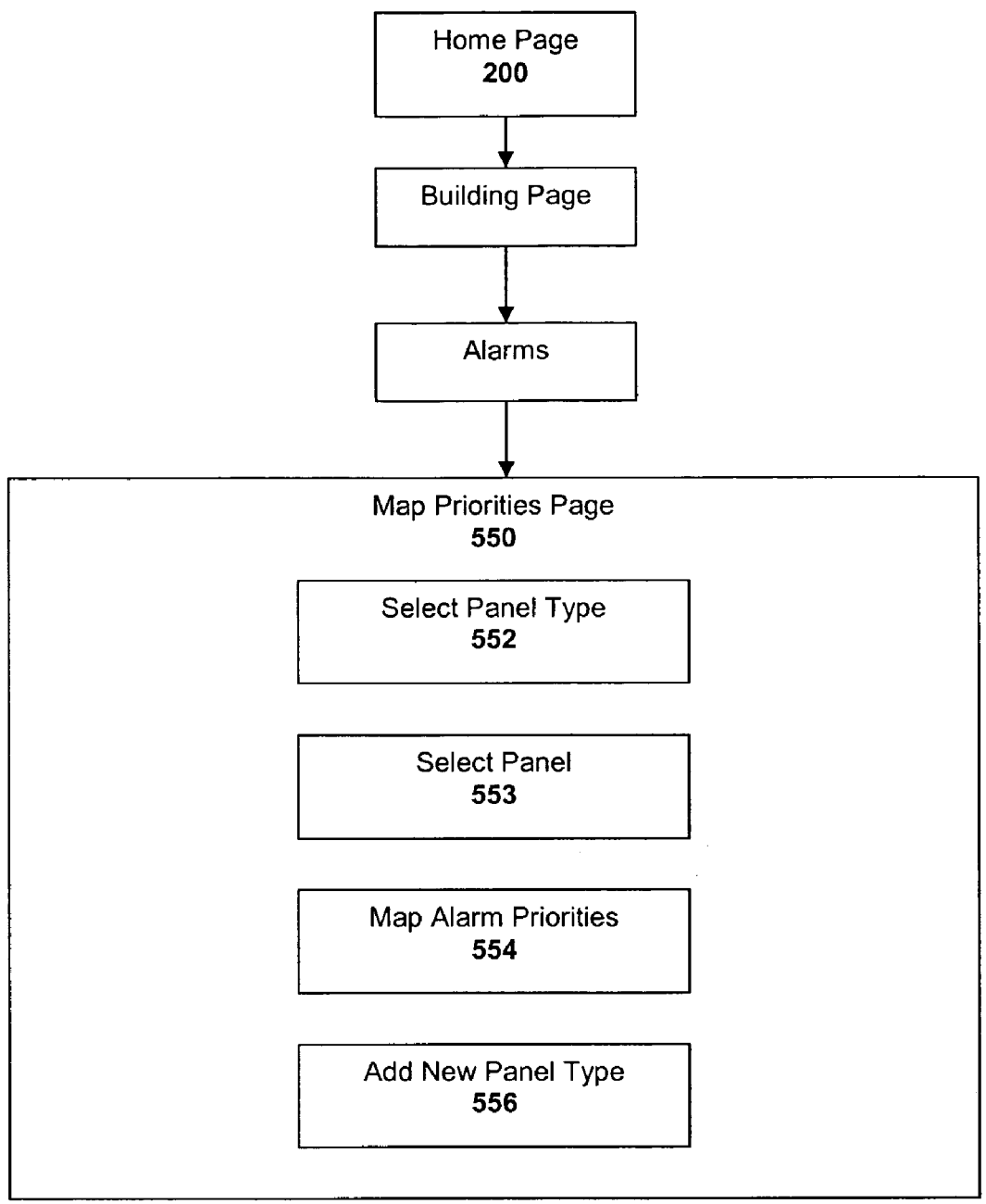
FIG. 23 is a user interface navigation diagram according to one embodiment of the invention.
Figure 24:
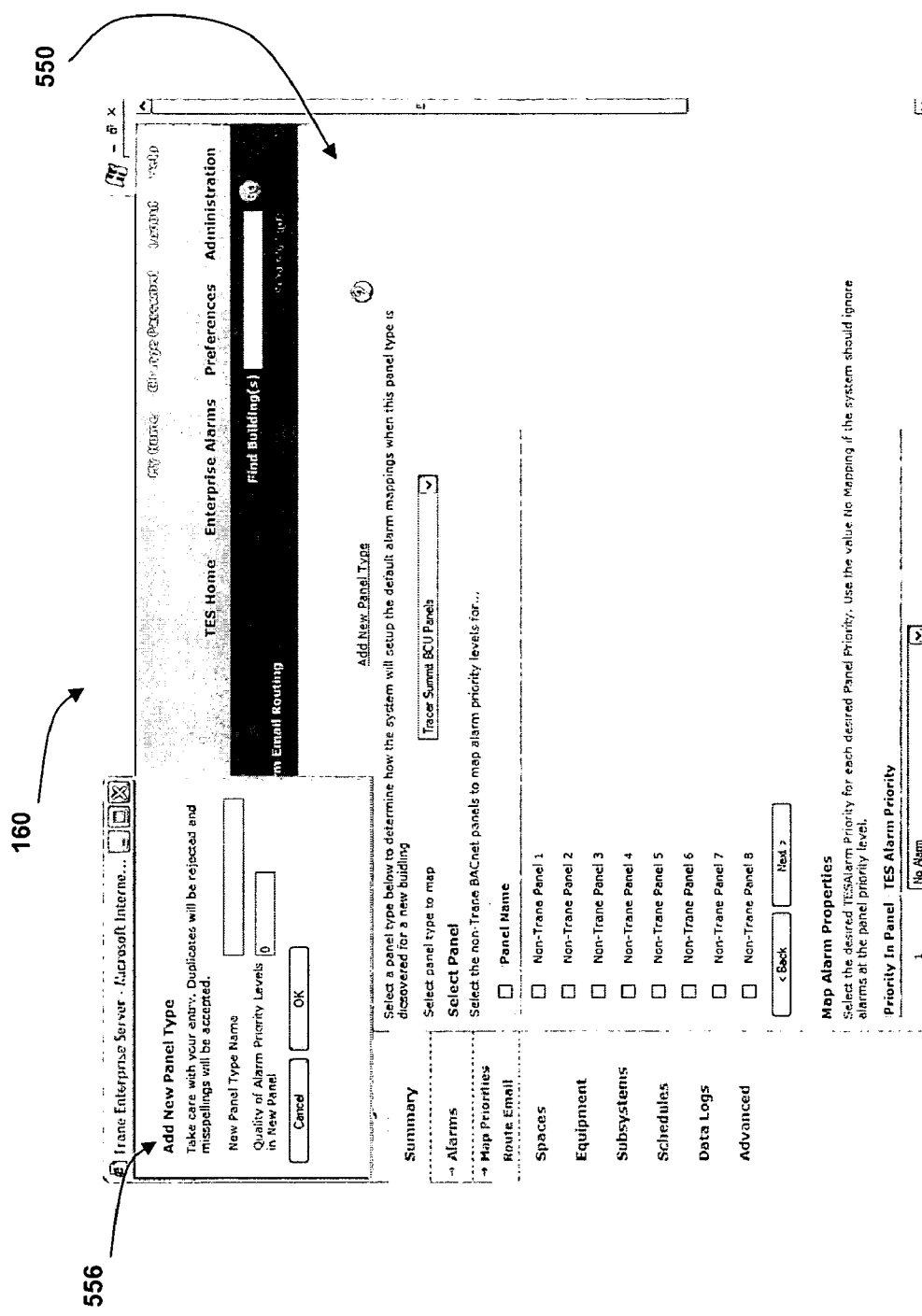
FIG. 24 is a user interface page according to one embodiment of the invention.

Navigation within user interface 160 to the alarm mapping pages according to one embodiment is represented in FIG. 23. Alarms tab 256 has a map priorities sub-tab 257 that directs a user to an alarm management page 550, such as that shown in FIGS. 22A-C, on which the user may select a panel type 552, view a list 553 of panels of different types, and map alarm priorities 554 based on panel priorities. Page 550 also allows the user to add new panel types 556, as shown in FIG. 24.

Alarm mapping refers to the assignment of priority levels to the panels based on panel type. In one embodiment, a user can specify alarm priorities to be assigned both to system panels and panels that have not yet been discovered by the system. By assigning alarm priorities for panels not yet discovered, user interface 160 gives the user control over how the dynamic extensibility of BAS 10 will be implemented in the context of future panel or building additions to the BAS.

Alarms are generated by BAS 10 in a variety of situations, such as when variances in temperature and other variances from predetermined setpoints are recorded. In one embodiment, BAS 10 alarm handling can be user customized. For example, alarm notifications may automatically be sent to one or more designated email or text message accounts. Audio or other text and visual notifications can also be automatically sent by BAS 10, such as to pagers, cellular phones, network broadcast messages, and the like. Within user interface 160, and in addition to or instead of email messages, alarms can also be displayed in tabular or list form on a building summary page.

According to alarm routing 226C, a user can also route email notifications for certain panel types that may be discovered by ESE 20 in the future. The routing and display of alarms may be customized by matching alarm attributes to one or more specific email recipients. Alarm attributes can relate to the type of alarm, time of alarm, alarm trigger, alarm location, occurrence or repetition of multiple alarms, patterns of alarms, or some other characteristic or combination of characteristics. Thus, in one example, a user who is the manager of a particular building at a site within BAS 10 can be designated within BAS 10 to receive alarm notifications for each alarm related to that building. In another example, a site manager and each member of the electrical maintenance staff of a building can be designated to receive alarm notifications related to electrical faults in that building. In yet another example, different alarm notification recipients and formats can be user customized based on the time of day or the day of the week. During the day when a user is generally interacting with user interface 160 directly via device 22, a tabular display on a building summary page can be specified. After hours, email and/or paging notifications can be used instead of or in addition to alarm notifications in user interface 160.

Alarm handling and priorities may also be customized in advance for panels to be discovered by ESE 20. Future panels may be assigned alarm priority status based on user preferences. A user may assign a general alarm priority or response based upon panels currently known in and any to be discovered in a particular building. Alarm priorities can also be assigned based upon panel characteristics. If a panel having a characteristic is later discovered, BAS 10 can automatically assign priority or handle alarms based upon the user-selected characteristic.

In another embodiment, BAS 10 can assign priority and manage alarms by default, by associating newly discovered panels as the same as or similar to known system panels and assigning like management features. For example, a user customizes the handling of alarms for a particular panel by specifying a response procedure. In the future if a new panel is discovered by BAS 10 and if the newly discovered panel shares characteristics with the panel for which a response has been set, BAS 10, in the absence of instructions or customization relating to the newly discovered panel, can similarly handle alarms for the newly discovered panel.

The invention therefore makes available a variety of user customizable management tools related to user interface 160 to improve efficiency and operability of BAS 10. The invention may be embodied in other specific forms without departing from the spirit of the essential attributes thereof; therefore the illustrated embodiment should be considered in all respects as illustrative and not restrictive, reference being made to the appended claims rather than to the foregoing description to indicate the scope of the invention.

What is claimed is:

1. A graphical user interface (GUI) apparatus for a building automation system (BAS) machine comprising:
   a processor communicatively coupled to the BAS machine; the processor being configured to process a database configured to store a relational directory of BAS information;
   a GUI display device communicatively coupled to the processor;
   means for presenting a user customizable home page configured to provide data and navigation tools and selectively displayed as a GUI via the GUI display device, including a summary page representing a building comprising at least a portion of the BAS machine, the summary page including:
   at least one navigable link connecting the summary page to another portion of the GUI;
   a static building information portion of the GUI, displayed via the GUI display device, configured to provide building specific information in the relational directory to a user; and
   an automatically updated dynamic building information portion of the GUI, displayed via the GUI display device, separate from the static building information portion, including:
   means for presenting an alarm list comprising static information stored in the database and dynamic information related to the presence or absence of an individual alarm or multiple alarms in the building, wherein the alarm list can be configured by the user to present the multiple alarms by order of severity or arrival time; and
   means for presenting a space list comprising static information stored in the database and dynamic information about a plurality of spaces related to the building, wherein the space list static information comprises at least a space setpoint stored in the database and the space list dynamic information comprises at least an observed condition related to the setpoint, wherein the plurality of spaces related to the building selectively displayed in the space list comprise a subset of all of the spaces, the subset comprising no more than a fixed quantity of the spaces and including the spaces having a variance between the setpoint and the observed condition that is greater than a variance between the setpoint and the observed condition for the spaces excluded from the subset.

2. The summary page of the apparatus of claim 1, wherein the at least one navigable link comprises a GUI navigation tab respectively linked to at least one other page within the GUI.

3. The summary page of the apparatus of claim 2, wherein the GUI navigation tab comprises at least one tab selected from a set consisting of a summary tab, an alarm tab, a spaces tab, an equipment tab, a subsystems tab, a schedules tab, a data log tab, and an administrative tab.

4. The summary page of the apparatus of claim 1, wherein the static and dynamic information of the alarm list comprises at least one selected from a set consisting of an alarm severity, an alarm timestamp, an alarm type, an alarm source, and an alarm detail.

5. The summary page of the apparatus of claim 4, wherein the alarm timestamp comprises a date and time.

6. The summary page of the apparatus of claim 4, wherein the alarm detail comprises an alarm diagnostic.

7. The summary page of the apparatus of claim 4, wherein the alarm list comprises a plurality of alarms arranged according to severity.

8. The summary page of the apparatus of claim 4, wherein the alarm list comprises a plurality of alarm arranged according to timestamp.

9. The summary page of the apparatus of claim 1, wherein the static and dynamic information of the alarm list comprises at least one navigable link to at least one other page within the GUI.

10. The summary page of the apparatus of claim 1, wherein the space setpoint comprises a temperature setpoint, and wherein the observed condition comprises a measured temperature.

11. The summary page of the apparatus of claim 1, wherein the static and dynamic information about a plurality of spaces further comprises at least one selected from a set consisting of a space name, an equipment type, a variance related to the setpoint and the observed condition, and a mode.

12. The summary page of the apparatus of claim 1, wherein the static building information portion comprises at least one selected from a set consisting of a building name, a building location, a building contact, and a graphical representation of at least a portion of the building.

13. The summary page of the apparatus of claim 12, wherein the graphical representation is provided by a navigable link to another page within the GUI.

14. The summary page of the apparatus of claim 1, wherein at least one of the static building information portion and the dynamic building information portion further comprise user-specified information.

15. The summary page of the apparatus of claim 14, wherein the user-specified information comprises a navigable link to a custom GUI page.

16. A graphical user interface (GUI) apparatus for a building automation system (BAS) machine comprising:

a processor communicatively coupled to the BAS machine;
the processor being configured to process a database configured to store a relational directory of BAS information;

a GUI display device communicatively coupled to the processor;

means for presenting a user customizable home page configured to provide data and navigation tools and selectively displayed as a GUI via the GUI display device, a space summary page representing a space comprising at least a portion of the BAS machine selectively displayable via the GUI, the space summary page including:

at least one navigable link connecting the summary page to another portion of the GUI;

a space information portion depicting data stored in the relational directory including:
an occupancy status of the space,
a controlling event calendar, stored in the database, of the space providing a programmable next event of the controlling event calendar of the space configured by a user, and
at least one representation of an intra-BAS relationship of the space with at least one other element of the BAS; and a space status portion including:
a space condition portion comprising static, dynamic, and user definable information stored in the database related to the space; and
a system status portion comprising static, dynamic, and user definable information stored in the database about at least one system related to the space;

wherein the at least one other element of the BAS comprises at least one selected from a set consisting of a building, a campus, a space, a system, a subsystem, and an end device, and wherein the programmable next event of the controlling event calendar provides a schedule preview to the user about the space;

a building summary page representing a building comprising at least a portion of the BAS machine selectively displayable via the GUI, the building summary page including:

at least one navigable link connecting the building page to another portion of the GUI;

an automatically updated dynamic building information portion including:

an alarm list comprising static and dynamic information stored in the database related to the presence or absence of an alarm in the building; wherein the alarm list can be configured by the user to present the multiple alarms by order of severity or arrival time; and a space list comprising static and dynamic information stored in the database about a plurality of spaces related to the building, wherein the space list static information comprises at least a space setpoint stored in the database and the space list dynamic information comprises at least an observed condition related to the setpoint, wherein the space list is limited to displaying less than all of the plurality of spaces related to the building, and wherein the plurality of spaces related to the building selectively displayed in the space list comprise a subset of alarmed spaces, the subset consisting of the alarmed spaces having a variance between the setpoint and the observed condition that is greater than a variance between the setpoint and the observed condition for the alarmed spaces excluded from the subset, while not displaying non-alarmed spaces; and an equipment summary page representing at least a portion of the BAS machine selectively displayable via the GUI, the equipment summary page including:

at least one navigable link connecting the equipment page to another portion of the GUI;

an equipment information portion comprising at least one representation of an intra-BAS relationship of the equipment with at least one other element of the BAS; and an equipment status portion including:

an equipment condition portion stored in the database comprising static, dynamic, and user definable information related to the equipment; and an equipment status portion stored in the database comprising static, dynamic, and user definable operational status information about the equipment;

wherein the at least one other element of the BAS comprises at least one selected from a set consisting of a building, a campus, a space, a system, a subsystem, and an end device, and wherein the intra-BAS relationship is defined by a common equipment type or space.

17. The summary page of the apparatus of claim 16, wherein the intra-BAS relationship of the space comprises a group membership of the space.

18. The summary page of the apparatus of claim 17, wherein the group membership of the space is displayed as a navigable link to another page of the GUI.

19. The summary page of the apparatus of claim 16, wherein the next event of the space comprises an event indicator and an event time schedule.

20. The summary page of the apparatus of claim 16, wherein the space condition portion comprises at least one selected from a set consisting of a space temperature and a space setpoint.

21. The summary page of the apparatus of claim 20, wherein the user definable information comprises a space setpoint.

22. The summary page of the apparatus of claim 16, wherein the user definable information of at least one of the space condition portion and the system status portion comprises a data log requestor.

23. The summary page of the apparatus of claim 16, wherein the system status portion comprises at least one end device associated with the system.

24. The summary page of the apparatus of claim 16, wherein the navigable links comprise a GUI navigation tab respectively linked to at least one other page within the GUI.

25. The summary page of the apparatus of claim 24, wherein the GUI navigation tab comprises at least one tab selected from a set consisting of a summary tab, an alarm tab, a spaces tab, an equipment tab, a subsystems tab, a schedules tab, a data log tab, and an administrative tab.

26. A graphical user interface (GUI) apparatus for a building automation system (BAS) machine, comprising:

a processor communicatively coupled to the BAS machine, the processor being configured to process a database configured to store a relational directory of BAS information;

a GUI display device communicatively coupled to the processor;

means for presenting an alarm list comprising static information stored in the database and dynamic information related to the presence or absence of an individual alarm or multiple alarms in the building, wherein the alarm list can be configured by the user to present the multiple alarms by order of severity or arrival time; and means for presenting a space list comprising static information stored in the database and dynamic information about a plurality of spaces related to the building, wherein the space list static information comprises at least a space setpoint stored in the database and the space list dynamic information comprises at least an observed condition related to the setpoint, wherein the plurality of spaces related to the building selectively displayed in the space list comprise a subset of all of the spaces, the subset comprising no more than a fixed quantity of the spaces and including the spaces having a variance between the setpoint and the observed condition that is greater than a variance between the setpoint and the observed condition for the spaces excluded from the subset;

means for presenting a user customizable home page configured to provide data and navigation tools and selectively displayed as a GUI via the GUI display device, including an equipment summary page representing at least a portion of the BAS machine, the equipment summary page including:

at least one navigable link connecting the equipment summary page to another portion of the GUI;

means for customizing the equipment summary page;

an equipment information portion comprising at least one representation stored in the relational directory of an intra-BAS relationship of the equipment with at least one other element of the BAS; and an equipment status portion separate from the equipment information portion including:

an equipment condition portion comprising static, dynamic, and user definable information in the relational directory related to the equipment; and a equipment status sub-portion, separate from the equipment condition portion, comprising static, dynamic, and user definable operational status information about the equipment in the relational directory, and a means for a user to enter status information into the relational directory;

wherein the at least one other element of the BAS comprises at least one selected from a set consisting of a building, a campus, a space, a system, a subsystem, and an end device, and wherein the intra-BAS relationship is defined by a common equipment type or space.

27. The equipment summary page of the apparatus of claim 26, wherein the equipment is a device selected from a set consisting of:

a panel, a sensor, a controller, a microprocessor-controlled device, a converter, a thermostat, a furnace, a heating system, a chiller, a cooling system, an air conditioner, an air filter, an air purifier, a fire and life safety system, a security system, an alarm system, an occupancy sensor, an electrical system monitor and controller, a lighting system monitor and controller, a ventilation system monitor and controller, a smoke sensor, a light sensor, a motion sensor, a humidity sensor, a pump, an air handler, fluid and air moving and handling equipment, a terminal device, life science and pharmacological control equipment and monitoring systems, a positive pressure clean room, a negative pressure clean room, industrial automation and control equipment and systems, and a programmable logic controller.

28. The equipment summary page of the apparatus of claim 26, wherein the intra-BAS relationship of the equipment comprises a group membership of the equipment where all of the equipment in the group are of the same equipment type.

29. The equipment summary page of the apparatus of claim 28, wherein the equipment information portion further comprises an operational status of the equipment, a controlling schedule of the equipment, and a next event of the equipment.

30. The equipment summary page of the apparatus of claim 29, wherein the next event of the equipment comprises an event indicator and an event time schedule.

31. The equipment summary page of the apparatus of claim 28, wherein the group membership of the equipment is displayed as a navigable link to another page of the GUI.

32. The equipment summary page of the apparatus of claim 26, wherein the equipment condition portion comprises at least one selected from a set consisting of a temperature, an output status, an input status, a pressure, a flow status, an equipment element status, and a setpoint.

33. The equipment summary page of the apparatus of claim 32, wherein the equipment element status relates to at least a portion of an end device selected from a set consisting of:
a panel, a sensor, a controller, a microprocessor-controlled device, a converter, a thermostat, a furnace, a heating system, a chiller, a cooling system, an air conditioner, an air filter, an air purifier, a fire and life safety system, a security system, an alarm system, an occupancy sensor, an electrical system monitor and controller, a lighting system monitor and controller, a ventilation system monitor and controller, a smoke sensor, a light sensor, a motion sensor, a humidity sensor, a pump, an air handler, fluid and air moving and handling equipment, a terminal device, life science and pharmacological control equipment and monitoring systems, a positive pressure clean room, a negative pressure clean room, industrial automation and control equipment and systems, and a programmable logic controller.

34. The equipment summary page of the apparatus of claim 33, wherein the portion of the end device comprises a pump, a duct, a condenser, a fan, or a damper.

35. The equipment summary page of the apparatus of claim 32,
wherein the user definable information of at least one of the equipment condition portion or the equipment status portion comprises an equipment setpoint.

36. The equipment summary page of the apparatus of claim 26, wherein the user definable information of at least one of the equipment condition portion and the equipment status portion comprises a data log requestor.

37. The equipment summary page of the apparatus of claim 26, wherein the operational status information comprises a dynamic measurement related to an equipment element.

38. The equipment summary page of the apparatus of claim 26, wherein the at least one navigable link comprises a GUI navigation tab respectively linked to at least one other page within the GUI.

39. The equipment summary page of the apparatus of claim 38, wherein the GUI navigation tab comprises at least one tab selected from a set consisting of a summary tab, an alarm tab, a spaces tab, an equipment tab, a subsystems tab, a schedules tab, a data log tab, and an administrative tab.

40. The equipment summary page of the apparatus of claim 26, wherein the equipment comprises a chiller plant, and wherein the equipment status portion comprises at least one chiller of the chiller plant.

41. The equipment summary page of the apparatus of claim 40, wherein the at least one chiller is displayed as a navigable link to a chiller page of the GUI.

* * * * *